(12) United States Patent
Triplett

(10) Patent No.: US 10,915,348 B2
(45) Date of Patent: Feb. 9, 2021

(54) TECHNOLOGIES FOR DUPLICATING VIRTUAL MACHINE STATES

(71) Applicant: Intel Corporation, Santa Clara, CA (US)

(72) Inventor: Josh Triplett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 15/420,773

(22) Filed: Jan. 31, 2017

(65) Prior Publication Data

US 2018/0217859 A1 Aug. 2, 2018

(51) Int. Cl.
*G06F 9/455* (2018.01)

(52) U.S. Cl.
CPC ........... *G06F 9/45558* (2013.01); *G06F 2009/45562* (2013.01); *G06F 2009/45583* (2013.01); *G06F 2009/45591* (2013.01)

(58) Field of Classification Search
CPC . G06F 2009/45583; G06F 2009/45591; G06F 3/0604; G06F 3/065; G06F 3/0664; G06F 3/067; G06F 9/45558
See application file for complete search history.

(56) References Cited

U.S. PATENT DOCUMENTS

| 4,590,467 A | 5/1986 | Lare | |
|---|---|---|---|
| 8,220,053 B1 * | 7/2012 | Sun | G06F 21/562 726/24 |
| 2004/0123185 A1 | 6/2004 | Pierce et al. | |
| 2008/0256314 A1 * | 10/2008 | Anand | G06F 11/1451 711/162 |
| 2008/0320258 A1 * | 12/2008 | Wayda | G06F 11/1435 711/162 |
| 2010/0007739 A1 | 1/2010 | Otani et al. | |
| 2010/0088474 A1 * | 4/2010 | Agesen | G06F 9/45537 711/147 |
| 2010/0100698 A1 * | 4/2010 | Yang | G06F 11/1451 711/162 |
| 2010/0114832 A1 * | 5/2010 | Lillibridge | G06F 16/128 707/649 |
| 2010/0122052 A1 * | 5/2010 | Waldspurger | G06F 11/1438 711/162 |

(Continued)

OTHER PUBLICATIONS

International Search Report and Written Opinion dated Feb. 21, 2018 for International Application No. PCT/US2017/061491, 18 pages.

(Continued)

*Primary Examiner* — Jorge A Chu Joy-Davila
(74) *Attorney, Agent, or Firm* — Schwabe, Williamson & Wyatt, P.C.

(57) ABSTRACT

Technologies for duplicating virtual machines (VMs) are described. A virtual machine monitor (VMM) may operate a parent virtual machine (VM), which may include a parent virtual memory and a parent virtual central processing unit (VCPU). The VMM or a host platform may obtain a command to duplicate the parent VM to create a child VM. In response to the command, the VMM or host may obtain a VCPU state of the parent VCPU, and generate the child VM including a child VCPU based on a state of the parent VCPU and a child virtual memory based on the parent virtual memory. Other embodiments are described herein and claimed.

24 Claims, 15 Drawing Sheets

(56) References Cited

U.S. PATENT DOCUMENTS

| | | | |
|---|---|---|---|
| 2010/0223613 A1* | 9/2010 | Schneider | G06F 9/45558 718/1 |
| 2012/0144391 A1 | 6/2012 | Ueda | |
| 2012/0243395 A1* | 9/2012 | Farey | G11B 5/86 369/84 |
| 2013/0055252 A1 | 2/2013 | Lagar-Cavilla et al. | |
| 2013/0159650 A1* | 6/2013 | Wakamiya | G06F 9/461 711/162 |
| 2014/0337845 A1 | 11/2014 | Ling et al. | |
| 2016/0098285 A1 | 4/2016 | Davis et al. | |
| 2016/0170788 A1 | 6/2016 | Tarasuk-Levin et al. | |

OTHER PUBLICATIONS

Josh Triplett, "Interrupt Generated Random Number Generator States," U.S. Appl. No. 15/368,326, filed Dec. 2, 2016, 34 pages.

Office Action dated Sep. 28, 2018 for U.S. Appl. No. 15/368,326, 8 pages.

Alex Amies et al., "Developing and Hosting Application on the Cloud", 2012, 7 pages.

"vSphere Virtual Machine Administration", May 4, 2018, 3 pages, VMware, Inc., Palo Alto, CA.

* cited by examiner

TECHNOLOGIES FOR DUPLICATING VIRTUAL MACHINE STATES

FIELD

The present disclosure relates to the field of data processing, and in particular, to apparatuses, methods and storage media for duplicating virtual machines.

BACKGROUND

Shared computing resources (e.g., one or more servers, computer storage devices, etc.) may utilize virtualization to isolate users and services from one another. Virtualization may include implementing a virtual machine monitor ("VMM") and/or hypervisor to operate one or more virtual machines ("VMs") on the shared computing resources, where each VM may operate one or more applications to perform various functions and/or provide various services to an individual user. In many deployment scenarios, a desired VM or VM state may be used as a starting point or initial state for a desired service, which may be duplicated in order to provide the same or similar services to individual users.

However, conventional procedures for duplicating VMs are time consuming and may require relatively large amounts of computing resources. Most conventional procedures used to duplicate VMs involve saving and reloading the full state of the VM. This approach is an expensive operation that precludes many potential performance-sensitive applications of this functionality. Other conventional procedures for duplicating VMs may include duplicating a VM state with reliance on a VMM running as a hypervisor with direct control over system page tables and other privileged resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
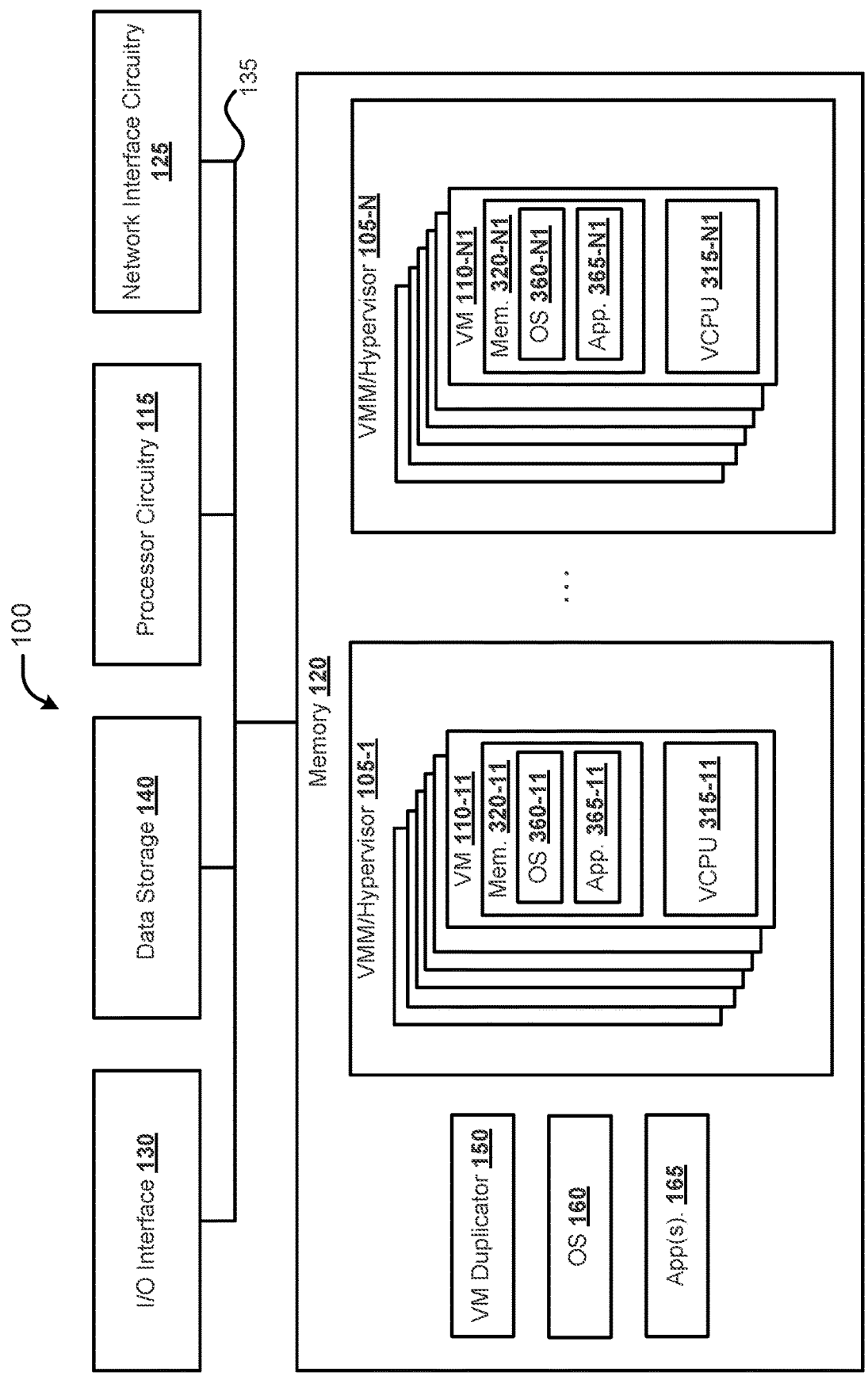
FIG. 1 illustrates the components of a computer platform suitable for practicing various embodiments of the present disclosure.

Embodiments are directed towards duplicating virtual machines (VMs) and/or VM states. The present disclosure provides mechanisms to duplicate (e.g., "fork") a running VM, usable in VM managers (VMMs) that run via host OS processes (e.g., Linux KVM), by duplicating the host VMM process and using it as a factory for creating child VMs. This speeds up creation of VMs by several orders of magnitude. The present disclosure also includes mechanisms to trigger the duplication (or fork) from within a guest VM itself. The guest VM can use this to indicate to the host VMM that it has reached a point immediately before starting performance of a distinct computation, such as mounting a root filesystem or running application code. The guest OS, in turn, can expose this mechanism to userspace code (e.g., via a "kfork" syscall), allowing the guest userspace to perform common computations prior to the duplication (or fork), and then duplicate the environment when a divergent computation is to begin. For example, a Linux® guest may make this call from its initramfs immediately before mounting the real root filesystem, or from a continuous-integration build server immediately before starting a build job.

In embodiments, a new (child) VM may be created by allocating memory from a parent VM that becomes the virtual random access memory (RAM) of the child VM, and creating a virtual CPU (VCPU) with a same state as a parent VCPU of the parent VM. This may be accomplished because the process memory of a virtual machine monitor (VMM) that implements the parent VM may also include the process memory of the parent VM. In embodiments, the VMM may execute a fork operation by making a copy-on-write (CoW) copy of the parent VM's RAM, and then creating, in a child process of the VMM, a new VCPU with the same state as the VCPU of the parent VM. The creation of the new VCPU may also be accomplished by performing a CoW operation on the VCPU registers of the parent VCPU. Once the child VM is created, the new VCPU within the child VM may operate. Because the embodiments use the CoW operation, the child VM may share the same memory (e.g., by referring to the same location in physical memory) as the parent VM until one of the VMs has to write to a portion of the shared memory, at which point, that portion of memory may be duplicated. In this way, multiple copies of a VM may be created, and each VM copy may use only as much memory as need by each VM copy. Thus, each VM copy may utilize a same copy of certain portions of the shared memory (e.g., file system cache, certain kernel or user states, etc.), while only duplicating parts of the memory necessary to provide services. Thus, the use of the VM copies may save physical computing resources.

In various embodiments, a VMM running a VM can pause execution of the running VM, read out and store any state not already available in the VMM process memory (e.g., virtual CPU (vCPU) register state(s) and the like), and then call a fork( ) to duplicate its own host process, including the memory of the VM. This results in a copy-on-write (CoW) copy of the entire guest memory and the VM state. In the child process, the VMM can create a new VM using the existing guest memory, reload the state it read out prior to the fork (e.g., by reloading vCPU registers), and start up the VM. The VMM can fork a VM on request from the user, or on request from the guest VM itself. In the latter case, the guest kernel can expose that operation to guest userspace via a system call, device, or similar interface. Other embodiments are described and/or claimed.

In these ways, the embodiments herein allows duplicating (e.g., forking) a VM's state many times faster than existing approaches, and works with VMMs that run under a host kernel (rather than as a hypervisor). Common approaches for VM duplication used today involve saving and reloading the full state of the VM, such as by using a system image or the like. A "system image" is a serialized copy of the entire state of a computer system at a given point in time, which is stored in a non-volatile form (e.g., as a file or archive file): similarly, a "disk image" is a computer file containing the contents and structure of a disk volume or an entire data storage device (e.g., a hard drive. USB flash drive, etc.). This approach is an expensive operation (in terms of resource consumption) that precludes many potential performance-sensitive applications of this functionality. Some approaches can duplicate a VM state more quickly, but rely a VMM running as a hypervisor with direct control over system page tables and other privileged resources. The embodiments related to exposing this functionality to the guest userspace provides fine-grained control over the guest state at the branch point, which allows execution of common userspace code prior to the branch. This supports many additional use cases, such as high-performance virtualized containers (or isolated user-spaces) and the like.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

The description may use the phrases "in an embodiment", "in an implementation", or in "embodiments" or "implementations", which may each refer to one or more of the same or different embodiments. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Moreover, the terms "comprising," "including," "having," and the like, as used with respect to embodiments of the present disclosure, are synonymous.

Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

As used herein, the term "circuitry" refers to, is part of, or includes hardware components such as an Application Specific Integrated Circuits (ASICs), field-programmable gate array (FPGAs), programmable logic arrays (PLAs), complex programmable logic devices (CPLDs), one or more electronic circuits, one or more logic circuits, one or more processors (shared, dedicated, or group) and/or memory (shared, dedicated, or group) that are configured to provide the described functionality. In some embodiments, the circuitry may execute computer-executable instructions to provide at least some of the described functionality. The computer-executable instructions may represent program code or code segments, software or software logics, firmware, middleware or microcode, procedures, functions, subprograms, routines, subroutines, one or more software packages, classes, or any combination of instructions, data structures, program statements, and/or functional processes that perform particular tasks or implement particular data types. The computer-executable instructions discussed herein may be implemented using existing hardware in computer devices and communications networks.

As used herein, the term "network element," may be considered synonymous to or referred to as a networked computer, networking hardware, network equipment, router, switch, hub, bridge, gateway, base station, access point, or other like device. The term "network element" may describe a physical computer device of a network with wired or wireless communication links. The term "network element" may describe equipment that provides radio baseband functions for data or voice connectivity between a network and one or more users. The term "channel" as used herein may refer to any transmission medium, either tangible or intangible, which is used to communicate data or a data stream. The term "radio link" may be synonymous with and/or equivalent to "link," "channel," "communications tunnel," and/or any other like term denoting a pathway or medium through which data is communicated.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. In addition, various additional operations might be performed, or described operations might be omitted in additional or alternative embodiments. Furthermore, the inclusion of a structural or method feature in a particular figure is not meant to imply that such feature is required in all embodiments and, in some embodiments, may not be included or may be combined with other features. Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

Referring now to the figures. FIG. 1 illustrates the components of a computer device 100, suitable for practicing duplication of VM of the present disclosure, in accordance with various embodiments. The computer device 100 may be embodied as any type of computation or computer device capable of performing various arithmetic, logical, input/output (I/O) operations.

In embodiments, the computer device 100 may be implemented as a web server, or an application server, in wired or wireless network. Examples computer devices may include a server computer device, such as a rack computing architecture component, a tower computing architecture component, and a blade computing architecture component.

The computer device 100 may include processor circuitry 115, memory 120, network interface circuitry (NIC) 125, input/output (I/O) interface 130, and data storage 140, each of which may be coupled by bus 135 at least as shown. In other embodiments, the computer device 100 may include additional or alternative components, such as those commonly found in computer devices (e.g., a display module and/or one or more display devices; power management circuitry; one or more batteries; one or more sensors; short range radiofrequency communications circuitry, cellular modem circuitry, etc.). Additionally, in some embodiments, one or more of the illustrative components may be incorporated in, or otherwise form a portion of another component. For example, the memory 120, or portions thereof, may be incorporated in the processor circuitry 115 in some embodiments. In another example, the memory 120, or portions thereof, may be incorporated in the processor circuitry 115 may be packaged together to form a single package, integrated circuit (IC), or system on chip (SoC).

Processor circuitry 115 may be configured to carry out instructions of computer programs by performing the basic arithmetical, logical, and input/output operations of the computer device 100. The processor circuitry 115 may include one or more processors (e.g., a single-core processor, a dual-core processor, a triple-core processor, a quad-core processor, etc.), one or more microcontrollers, one or more digital signal processors (DSPs), FPGAs (hardware accelerators), and/or other processor or processing/controlling circuit.

The processor circuitry 115 may perform a variety of functions for the computer device 100 by executing program code, logic or software modules, firmware, middleware, microcode, hardware description languages, and/or any other like set of instructions stored in the memory 120. These functions may include virtualization functions, such as performing translations between guest OS 360 requests/instructions and the hardware platform. In this regard, the processor circuitry 115 may be enabled with a virtualization technology (VT), such as Intel® VT. The program code may be provided to processor circuitry 115 by memory 120 via bus 135 and/or via NIC 230 or a separate drive mechanism (not shown). On execution of the program code by the processor circuitry 115, the processor circuitry 115 may cause the computer device 100 to perform the various operations and functions delineated by the program code, such as the various example embodiments discussed herein. In embodiments where processor circuitry 115 includes (FPGA based) hardware accelerators as well as processor cores, the hardware accelerators (e.g., the FPGA cells) may be pre-configured (e.g., with appropriate bit streams) with the logic to perform some of the functions of OS 160 and/or application(s) 165 (in lieu of employment of programming instructions to be executed by the processor core(s)).

Although not shown, the processor circuitry 115 may include a cache memory, which may be embodied as any type of cache memory that the processor circuitry 115 can access more quickly than the memory 120 for storing instructions and/or data for execution, such as an on-die cache or an on-processor cache. In some embodiments, the cache memory may be an off-die cache, but reside on the same SoC as the processor circuitry 115.

Data storage 140 (also referred to as "computer-readable media 140" or "CRM 140") may be any type of device or devices configured for short-term or long-term storage of data such as, for example, memory devices and circuits, memory cards, hard disk drives, solid-state drives, or other data storage devices. For example, the data storage 140 may be configured to store one or more OSes (e.g., OS 160) to be initialized and/or executed by the computer device 100. In some embodiments, portions of the OSes may be copied to the memory 120 during operations for faster processing and/or for any other reason. In addition, the data storage 140 may be configured to store data items for the one or more VMM/hypervisors 105, one/or more VMs 110, and/or other data items.

Memory 120 (also referred to as "computer-readable media 120" or "CRM 120") may be embodied as any type of volatile or non-volatile memory or data storage. The CRM 120 may be configured to store an operating system (OS) 160 and program code for one or more software components, such as VM duplicator 150 and/or one or more application(s) 165. CRM 120 may be a computer readable storage medium that may generally include a volatile memory (e.g., random access memory (RAM), synchronous dynamic RAM (SDRAM) devices, double-data rate synchronous dynamic RAM (DDR SDRAM) device, flash memory, and the like), non-volatile memory (e.g., read only memory (ROM), solid state storage (SSS), non-volatile RAM (NVRAM), and the like), and/or other like storage media capable of storing and recording data. Instructions, program code and/or software components may be loaded into CRM 120 by one or more network elements via NIC 125 using wired communications interfaces (e.g., from application server 120, a remote provisioning service, etc.). In some embodiments, software components may be loaded into CRM 120 during manufacture of the computer device 100, or loaded from a separate computer readable storage medium into memory 120 using a drive mechanism (not shown), such as a memory card, memory stick, removable flash drive, removable sim card, a secure digital (SD) card, and/or other like computer readable storage medium (not shown).

During operation, memory 120 may include VM duplicator 150, Virtual Machine Monitors (VMMs)/hypervisors 105-1 to 105-N (collectively referred to as "VMM/hypervisor 105" "VMM 105", hypervisor 105" etc.), OS 160, and application(s) 165 ("App(s). 165" in FIG. 1). OS 160 may manage computer hardware and software resources and provide services for computer programs implemented by the computer device 100. OS 160 may include a kernel to provide memory management, device/component management, and processor/task management functions. OS 160 may include one or more drivers and/or application programming interfaces (APIs) that provide an interface to hardware devices thereby enabling OS 160, VMMs 105, VM duplicator 150, and application(s) 165 to access hardware functions without needing to know the details of the hardware itself. The OS 160 may be a general purpose operating system or an operating system specifically written for and tailored to the computer device 100. Application(s) 165 may be a collection of logic and/or program code that enables the computer device 100 to perform various other functions of the computer device 100.

The memory 120 may store one or more VMMs/hypervisors 105-1 to 105-N, where N is a number of VMMs/hypervisors. The VMM/hypervisors 105 may be program code that creates and operates one or more virtual machines (VMs) 110-11 to 110-NM, where M is a number of VMs (collectively referred to as "VM 110" or "VMs 110"). In FIG. 1, each VM 110 is labeled based on the VMM 105 that operates the VM 110 and a duplication number of the VM 110. For example, as shown by FIG. 1, VM 110-11 may be operated by VMM 105-1 and may be a first duplicate of a desired VM. In some cases, VM 110-11 may be a parent VM 110 or a VM 110 to be duplicated. However, any VM 110 may be duplicated or act as a parent VM 110. Additionally, VMM 105-1 may operate VMs 110-12 to 110-1M (not labeled in FIG. 1), a second VMM 105-2 (not shown by FIG. 1) may operate VMs 110-21 to 110-2M (not shown by FIG. 1), and VMM 105-N may operate VMs 110-N1 to 110-NM (not labeled in FIG. 1). The computer device 100 implementing one or more VMMs/hypervisors 105 may be referred to as a host machine and the like, and each VM 110 may be referred to as a guest machine.

In embodiments, each VM 110 may be used to provide a particular service to an individual user or customer, such as email services, social networking services, online/interactive video game services, data storage and/or cloud computing services, customer relation management services, enterprise services, and the like. In order to provide the various services, various embodiments provide that a VM 110 may be duplicated based on receipt of a request for a particular service from a user. For example, the VMM 105-1 may be used to implement an email service, where VM 110-11 includes a VM state that initiates a user session once a user logs into the email service. In this example, when a user authentication request is obtained by the computer device 100 (e.g., via the MC 125), the VM duplicator 150 may duplicate the VM 110-11 as a child VM 110-12, which may provide the user session.

The VMs 110 may each include a virtual central processing unit (VCPU) 315-11 to 315-NM (collectively referred to as "VCPU 315" or "VCPUs 315") and virtual memory 320-11 to 320-NM (collectively referred to as "memory 320" or "virtual memory 320"). Each VCPU 315 may emulate one or more physical processors or processor cores such that a VCPU 315 may be seen as one or more physical processors or processor cores by a corresponding OS 360. Some VMs 110 may be configured to have specific VCPU capabilities that are different than VCPU capabilities of other VMs 110. Each VCPU 315 may be allocated a portion of a processor cycle of the one or more physical processors or processor cores by a VM 105 in which it operates. In this way, the VCPUs 315 may be viewed as a share of time spent in the processor(s)/processor cores, or as a number of allocated processor time slots. Additionally, some VCPUs 315 may have different resource allocations based on the type of processors being emulated, system administrator configurations, and/or other like criteria. Additionally, the VCPUs 315 may also include one or more VCPU registers 317 (shown and described with regard to FIGS. 3-8 and 10-14). The specific VCPU registers 317 included in, or associated with a VCPU 315 may be based on the type of processor(s) being emulated by that VCPU 315.

The virtual memory 320 may emulate one or more memory modules, such as one or more RAM chips, such that a virtual memory 320 may be seen as one or more physical memory devices by a corresponding OS 360. For purposes of the present disclosure, the memory 320 may represent virtualized system memory (e.g., virtualized version of memory 120), virtualized persistent storage (e.g., virtualized version of a data storage 140), or both. The memory 320 may store guest OSes 360-11 to 360-NM (collectively referred to as "OS 360", "guest OS 360", and the like) and one or more applications (app.) 365-11 to 365-NM (collectively referred to as "application(s) 365" and the like). The VMMs/hypervisors 105 may provide OSes 360 with a virtual operating platform and may manage the execution of the OSes 360. During execution, the VMs 110 may consume computing resources such as processor cycles, cache and memory space/accesses, I/O operations, network resources, and/or other like computing resources.

In various embodiments, the VMMs/hypervisors 105 may be a type 2 hypervisor (also referred to as a "host hypervisor") that may operate as an application on top of an existing operating system (e.g., OS 160). In such embodiments, the VMMs/hypervisors 105 may monitor their VMs 110 and redirect requests for computing resources to suitable drivers/APIs of the host OS 160. In other embodiments, the VMMs/hypervisors 105 may be a type 1 hypervisor (also referred to as "bare-metal hypervisor" or a "hardware virtualization engine") that may run directly on top of the hardware of the computer device 100. In such embodiments, the VMMs/hypervisors 105 may monitor their VMs 110 and process requests for computing resources in a similar manner as a host kernel or host OS 160.

In various embodiments, the VM duplicator 150 may be program code or a hardware accelerator that may duplicate or clone a desired VM 110 by duplicating a host/parent VMM 105 and using the host/parent VMM 105 to create one or more child VMs 110. In embodiments, the VM duplicator 150 may be operated by the host platform, by one or more of the VMMs 105, and/or one or more of the VMs 110 including the desired VM 110 to be duplicated. During operation, the VM duplicator 150 may obtain a command or trigger 350 to duplicate a host/parent VMM 105 (shown and described with regard to FIGS. 3 and 10). The command/trigger 350 may be received from a VM 110 itself, from the guest OS 160, from an application 165 or 365, and/or from outside of the computer device 100 (e.g., via a request obtained over a network, etc.). In some embodiments, the command/trigger 350 may be based on the host VMM 105 satisfying one or more conditions. For example, the one or more conditions may include the host VMM 105 and/or parent VM 110 reaching a point immediately before performance of a distinct computation, such as mounting a root filesystem or running particular application code.

In some embodiments, the command/trigger 350 may be issued by a guest OS 360 to the VMM 105 that operates the guest OS 360 via a system call or I/O command, and in response, the VMM 105 may operate the VM duplicator 150 or pass the command/trigger 350 to the VM duplicator 150 when implemented by the host platform. In such embodiments, the command/trigger 350 may be referred to as an "internal trigger" or "internal command." Internal commands/triggers may be used when the command/trigger 350 is based on the host VMM 105 satisfying one or more conditions as discussed previously. In some embodiments, an internal command/trigger 350 may be a kernel fork ("kfork") system call. The kfork system call may be one possible guest OS 360 mechanism to implement the internal command/trigger 350, which may operate analogously to a fork system call but may operate for an entire VM 110.

In other embodiments, the command/trigger 350 may be issued by a VM 110 other than the VM 110 to be duplicated (which may be operated by the same or different VMM 105), wherein the other VM 110 may issue the command/trigger

350 to the VM duplicator 150 when implemented by the VMM 105 or by the host platform. In such embodiments, the command/trigger 350 may be referred to as an "external trigger" or "external command." External commands may be used in cases where a particular VM state is set up to test or debug an application under particular system state or system contexts, and/or when the command/trigger 350 is based on a user request, a device request, sensor input, etc.

In embodiments where the VMM(s) 105 are type 2 hypervisors, the VM duplicator 150 may duplicate or clone a currently running VM 110 by duplicating a host or parent VMM 105 process and using the host/parent VMM 105 process to create one or more child VM 110 processes. In such embodiments, the command or trigger to duplicate the VM 110 may include a fork system call, which may allow a user space of a parent process to make a copy of itself (referred to as a "child process") where the only difference between the two copies is that they receive a different return value from that called fork system call. The fork system call may allow the child process, once created, to continue running starting from the same state as the parent process at a time immediately before the fork system call was executed.

The fork system call may be a copy-on-write (CoW) mechanism where the parent and child processes point to a same memory space and duplication of that memory space does not take place until the parent or child process attempts to modify a portion of the memory space. After the CoW operation is performed, both the parent process and the child process may have access to read-only access to the same page tables in the virtual memory 320 and/or physical memory 120. When the parent or child process attempts to perform a write operation on the page tables, the OS 360 may view such an attempt as an access violation, and may copy the accessed data and change the page tables so that the accessing process has a writable copy of that data. This may allow memory resources to be shared by the parent and child processes until modification occurs, which may significantly reduce resource consumption of unmodified copies while adding relatively small overhead to resource modifying operations.

In other embodiments, the command or trigger to duplicate the VM 110 may include using the kfork system call. The kfork system call may allow the user space of the parent process (e.g., a parent VM 110 or parent VMM 105) to perform common computations prior to the duplication of the VMM 105 or VM 110, and provide for divergent computations after the duplication. In embodiments, the fork system call may be used by a type-2 hypervisor 105 implementing the VM duplicator 150 to duplicate a VMM 105 process whereas the kfork system call may be used by a guest OS 360 implementing the VM duplicator 150 to duplicate the VM 110 in which the guest OS 360 operates.

As a first example, a guest OS 360-N1 of VM 110-N1 may make the kfork system call from its initial RAM file system ("initramfs") immediately before mounting a real root filesystem, or may make the kfork system call from a continuous-integration (CI) build server immediately before starting a build job. After the child VM 110 is created (e.g., VM110-N2 including a guest OS 360-N2) via the fork system call, the child VM 110 may perform operations to mount the real root filesystem or initiate the build job.

As a second example, the VM 110-11 may be implement a web server, and an application 365-11 operated by the VM 115-11 may provide web server services to an individual user or customer. In this example, the application 365-11 may obtain a request from a user, and in response to receipt of the request, the application 365-11 or the VM 110-11 may call the fork system call to make a duplicate of itself. Once the duplicate (e.g., VM 110-12 including application 365-12) is created, the duplicate may call the exec system call to execute functions for processing the request.

In embodiments where the VMM(s) 105 are type 1 hypervisors, the VM duplicator 150 may duplicate or clone a currently running VM 110 by pausing the VCPU 315 of the parent VM 110, generating or creating a CoW mapping of the memory 320 including the guest OS 360, and obtaining or determining a VCPU state of the parent VCPU 315. In embodiments, generation or creation of the CoW memory mapping may take place prior to generation of the child VM 110 and/or prior to retrieval of the VCPU state of the parent VCPU 315. In embodiments, the child virtual memory 320 may be based on the CoW memory mapping and the child VCPU 315 may be based on values in the VCPU registers 317 associated with the parent VCPU 315. Such embodiments may be performed by type 1 hypervisors 105 since type 1 hypervisors typically have privileges akin to OS kernels, such as the privilege to perform CoW operations without duplicating an entire hypervisor 105 process.

I/O interface 230 may be a computer hardware component that provides communication between the computer device 100 and one or more other devices (e.g., other nodes 110 in the cluster, interconnect device 120, computer device 100, destination computer device 106, etc.). The I/O interface 230 may include one or more user interfaces designed to enable interaction with the computer device 100 and/or peripheral component interfaces designed to provide interaction between the computer device 100 and one or more peripheral components. User interfaces may include, but are not limited to a physical keyboard or keypad, a touchpad, a speaker, a microphone, a fingerprint or handprint scanning device, etc. Peripheral component interfaces may include, but are not limited to, a non-volatile memory port, communications ports (e.g., universal serial bus (USB) port, FireWire port, Serial Digital Interface (SDI) port), IEEE 1284 port, etc.), an audio jack, a power supply interface. In some embodiments, the I/O interface 230 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the I/O operations. In some embodiments, the I/O interface 230 may form a portion of a SoC and be incorporated, along with the processor circuitry 115, the memory 120, and other components of the computer device 100, on a single integrated circuit chip.

Bus 135 may be configured to enable the communication and data transfer between processor circuitry 115, memory 120, NIC 125, I/O interface 130, and data storage 140. Bus 135 may comprise a high-speed serial bus, parallel bus, internal universal serial bus (USB), Front-Side-Bus (FSB), a PCI bus, a PCI-Express (PCI-e) bus, a Small Computer System Interface (SCSI) bus, an SCSI parallel interface (SPI) bus, an Inter-Integrated Circuit (I2C) bus, a universal asynchronous receiver/transmitter (UART) bus, and/or any other suitable communication technology for transferring data between components within computer device 100.

NIC 125 may be embodied as any type of communication circuit(s), device(s), hardware component(s) or collection thereof, capable of enabling communications between the computer device 100 and other computing or networking devices via one or more communication networks (e.g., local area networks, personal area networks, wide area networks, a global network such as the Internet, etc.). To this end, NIC 125 may include one or more communication interfaces (e.g., ports) and one or more dedicated processors and/or FPGAs (also referred to as "processor circuitry") to communicate using one or more wired network communications protocols, such as Ethernet, token ring, Fiber Distributed Data Interface (FDDI), Point-to-Point Protocol (PPP), network sockets, and/or other like network communications protocols). The communication interfaces may be configured to communicatively couple the computer device 100 to any number of other external devices and/or networks (e.g., physical or logical networks). In this regard, each communication interface may be associated with a network socket address (e.g., a combination of an IP address and port number) or other like address that allows other devices to connect to the computer device 100. The NIC 125 may also include one or more virtual network interfaces configured to operate with the one or more applications of the computer device 100. In this regard, the various embodiments discussed herein may be applicable to duplicating one or more virtual network interfaces.

Figure 2:
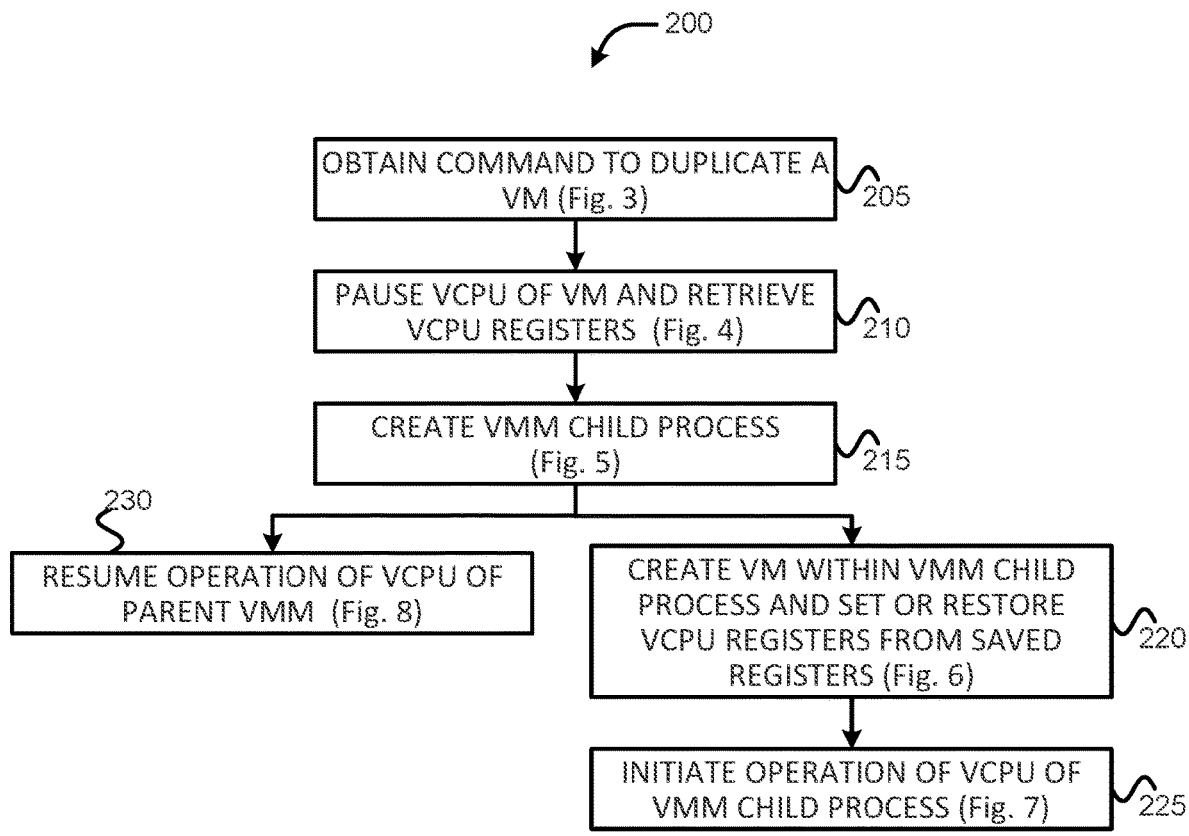
FIG. 2 illustrates an example process for duplicating VM states in accordance with various embodiments.

FIG. 2 illustrates a process 200 for duplicating a VM 110, in accordance with various embodiments. FIGS. 3-8 illustrate various stages, each of which corresponds to an operation of process 200. In particular, each of FIGS. 3-8 illustrate an example VMM 105 and/or VM 110 that may be implemented by computer device 100 as each operation of process 200 is performed using the computer device 100. For illustrative purposes, the operations of process 200 are described as being performed by the VM duplicator 150 as implemented by the computer platform circuitry 300, which may include the one or more hardware components of the computer device 100 as shown and described with regard to FIG. 1. However, it should be appreciated that other components of the computer device 100 may perform the operations of process 200. In addition, process 200 may be performed when the VM 110 to be duplicated is operated by a type 2 hypervisor 105. Furthermore, while particular examples and orders of operations are illustrated in FIGS. 2-8, in various embodiments, these operations may be re-ordered, broken into additional operations, combined, and/or omitted altogether.

Figure 3:
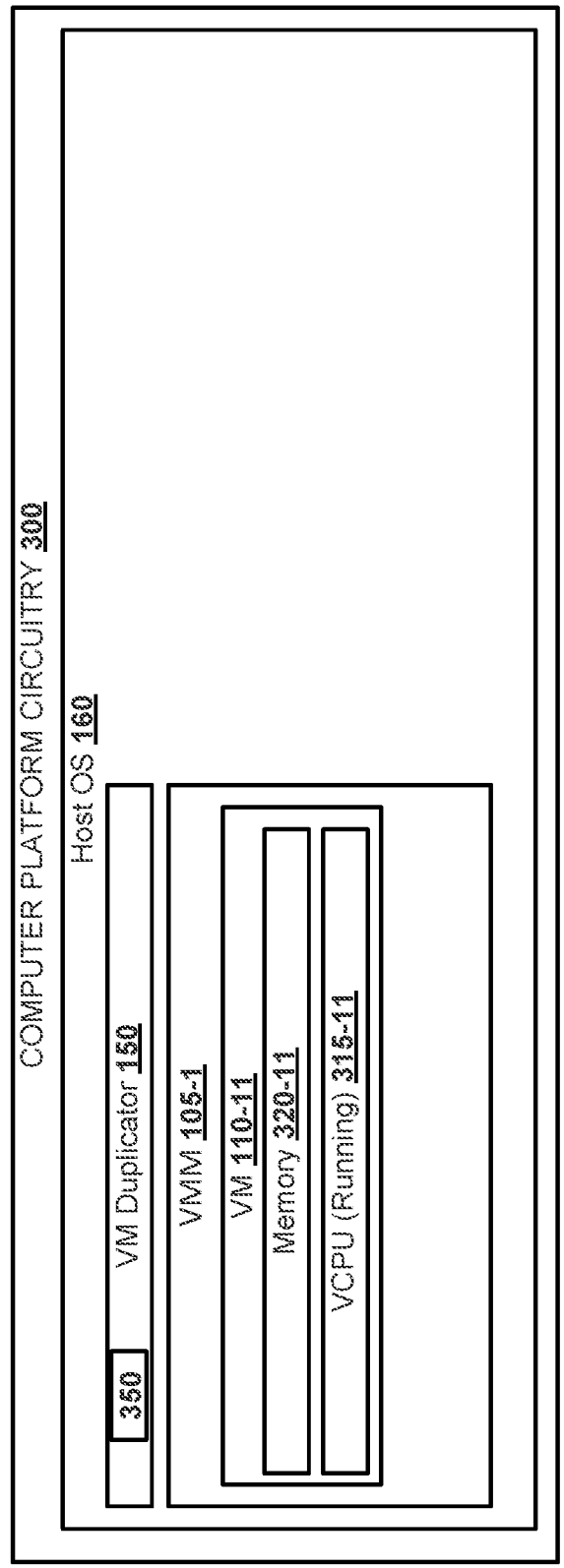
FIGS. 3-8 illustrate stages of performing the process of FIG. 2.

Referring to FIG. 2, process 200 may begin at operation 205 where the VM duplicator 150 may obtain or receive a command/trigger 350 to duplicate a VM 110, such as VM 110-11 operated by VMM 105-1 as shown by FIG. 3. In this case, the VM 110-11 may be referred to as the "parent VM" and the VMM 105-1 may be referred to as the "parent VMM." As can be seen by FIG. 3, the memory 320-11 may be allocated within the VMM 105-1 process, and the VM 110-11 is configured to access the memory 320-11. Additionally, the VCPU 315-11 may execute program code within the VMM 105-1, and the VCPU registers of the VCPU 315-11 are not directly exposed to the VMM 105-1 while running. The VCPU 315-11 may be referred to as the "parent VCPU" and the memory 320-11 may be referred to as the "parent memory" or the "parent virtual memory." As discussed previously, the command/trigger 350 may be obtained or received from the parent VMM, the parent VM, one or more applications 165 or 365, upon satisfying one or more conditions, and the like. In embodiments, the command/trigger 350 may be a kfork system call from within VM 110-11. Furthermore, although FIG. 3 shows the VM duplicator 150 residing outside of the VMM 105-1 and VM 110-11, in various embodiments, the VM duplicator 150 may be implemented by the VMM 105-1 and/or the VM 110-11.

Figure 4:
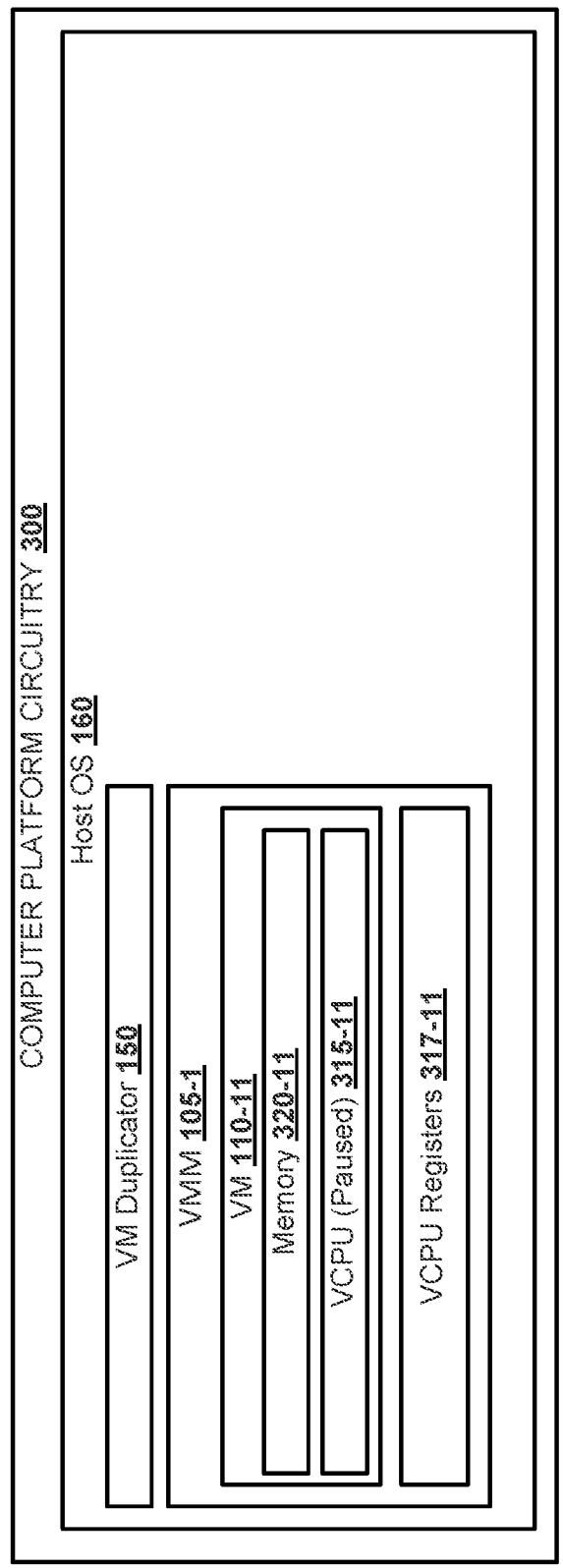

Referring back to FIG. 2, at operation 210, the VM duplicator 150 may pause the VCPU 315-11 of the VM 110-11 and retrieve VCPU registers 317-11 as shown by FIG. 4. In some embodiments, prior to retrieval, the VCPU registers 317-11 may reside within the VCPU 315-11. In embodiments, the VCPU registers 317-11 may store values associated with the parent VCPU 315-11 at the time of being paused, such as instructions to be executed by VCPU 315-11 (e.g., values stored in a memory data register (MDR), current instruction register (CIR), etc.), address locations for obtaining instructions to execute (e.g., values of a program counter (PC) register, memory address register (MAR), etc.), values used for arithmetic operations (e.g., values of an accumulator register, etc.) and/or the like. The size and/or type of values stored in the VCPU registers 317-11 may be based on the type of processor(s) that the VCPU 317-11 emulates.

Figure 5:
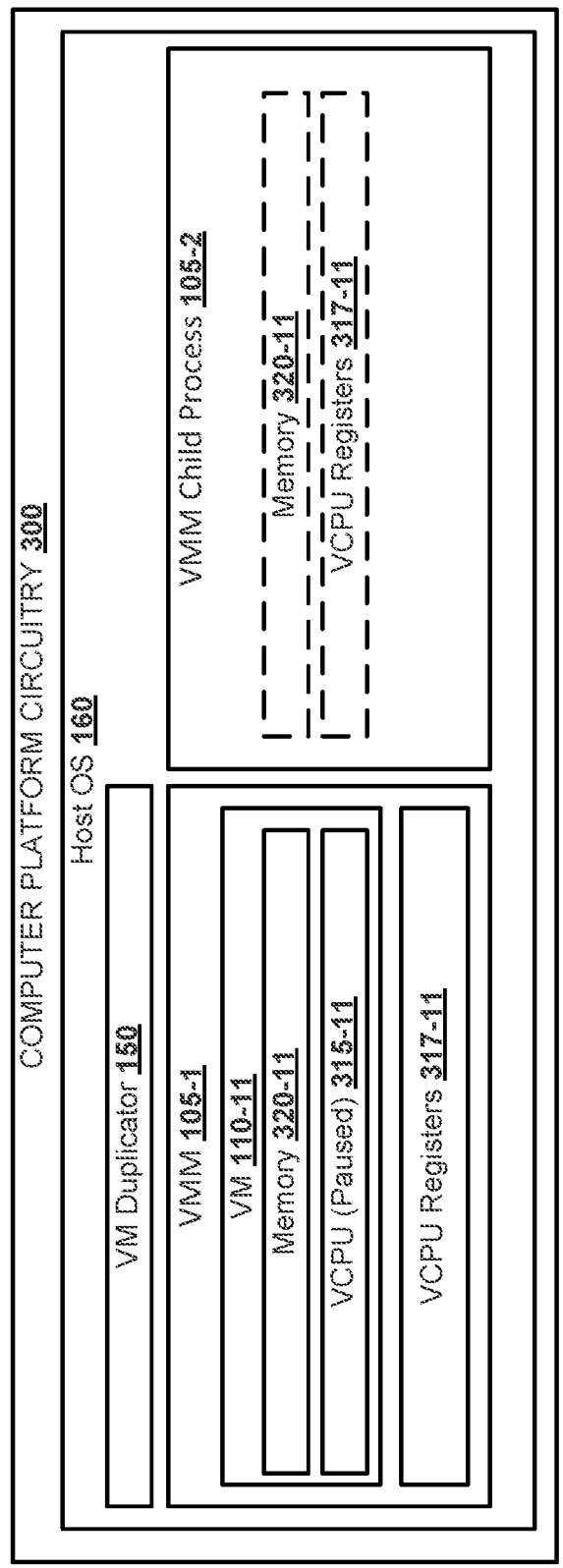

Referring back to FIG. 2, at operation 215, the VM duplicator 150 may create a VMM 105-2 child process, as shown by FIG. 5. In FIG. 5, the state of the computer device 100 is shown after the VM duplicator 150 has called the fork system call ("fork( )") in the host OS 160. In embodiments, the VM duplicator 150 may not duplicate the VM 110-11 object, and instead, the VM duplicator 150 may duplicate the memory 320-11 and VCPU registers 317-11 stored within the parent process (e.g., VMM 105-1). The dashed boxes in FIG. 5 representing the memory 320-11 and the VCPU registers 317-11 in the VMM 105-2 child process indicate that these are CoW copies of the original memory 320-11 and original VCPU registers 317-11 within the parent VMM 105-1 process. The CoW copies may not take up additional space in the physical memory 120, and may not require performing a full copy operation.

Referring back to FIG. 2, after creation of the VMM 105-2 child process, the VM duplicator 150 may proceed to operation 220 and/or operation 230 (discussed infra) in any order or concurrently.

Figure 6:
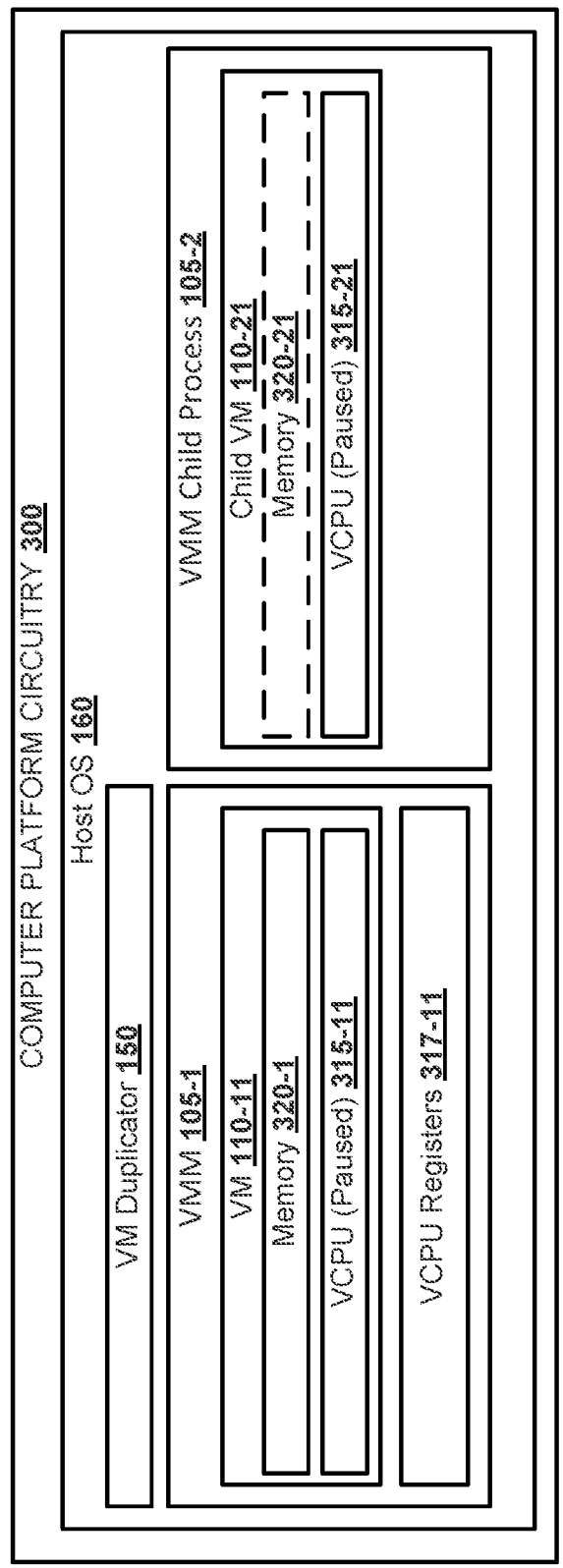

At operation 220, the VM duplicator 150 may create a VM 110-21 within the VMM 105-2 child process, and set or restore VCPU registers 317-11 from the saved VCPU registers 317-11, as shown by FIG. 6. FIG. 6 shows the state of the computer device 100 after the VMM 105-2 child process creates a VM 110-21 referencing the memory 320-21 that is the same as memory 320-11 (e.g., represented by the dashed rectangle in FIG. 6), and initializes the VCPU state of the VCPU 315-21. The VCPU state of the VCPU 315-21 may be based on the values that were stored in the VCPU registers 317-11 at operation 210.

Figure 7:
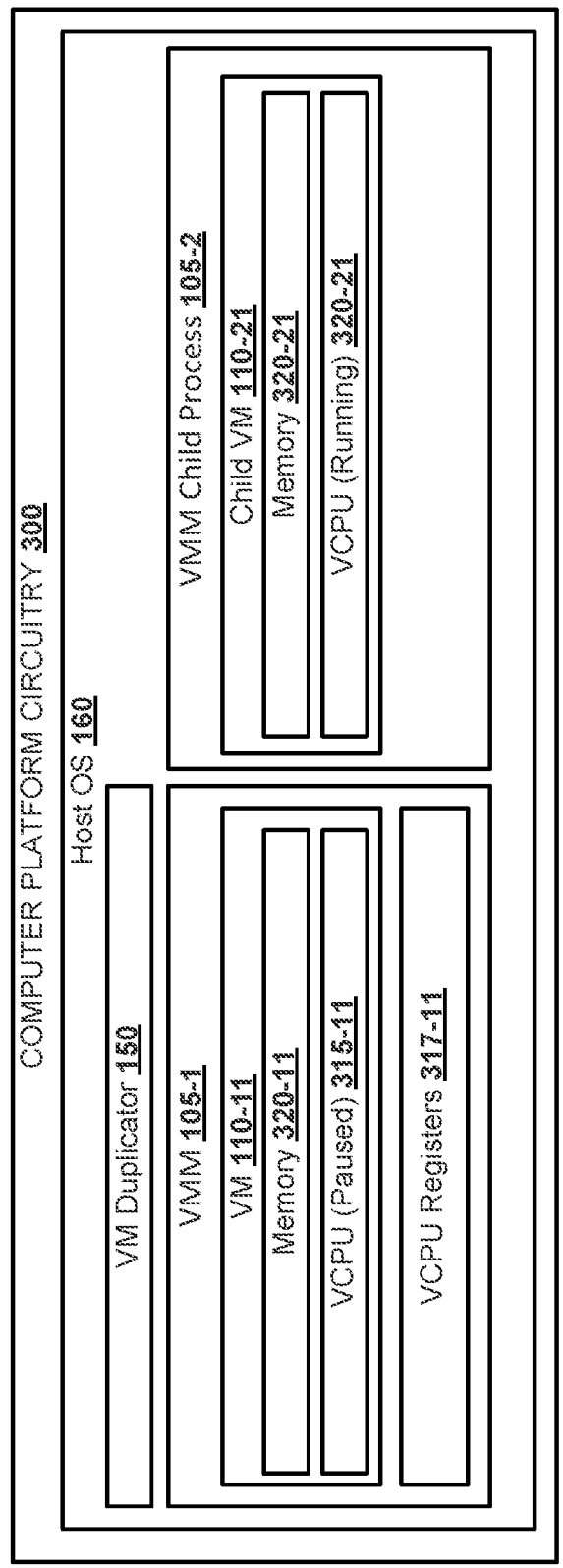
Figure 8:
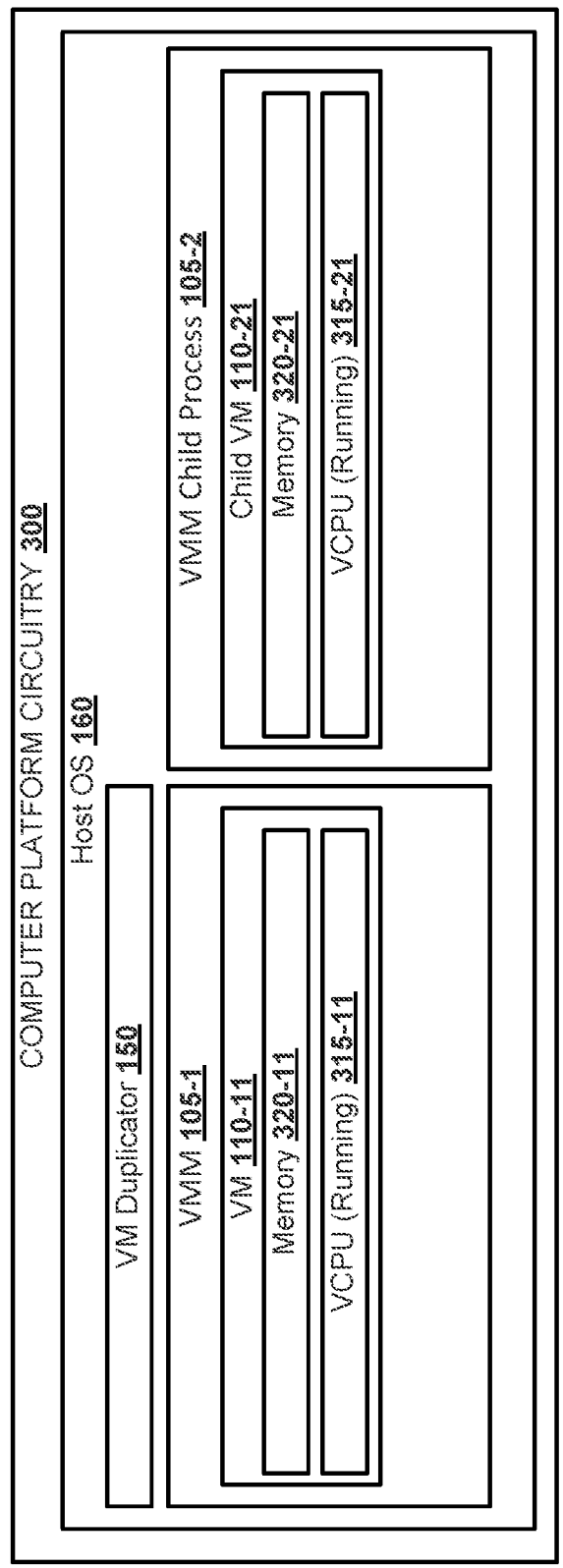

Referring back to FIG. 2, at operation 225, the VM duplicator 150 may initiate operation of the VCPU 315-21 of the VMM 105-2 child process, as shown by FIG. 7. In FIG. 7, the state of the computer device 100 is shown with the VCPU 315-21 of the child VMM 105-2 process running. Once the VCPU 315-21 starts executing code within the memory 320-21, any pages to which the VM 110-21 writes may get copied on demand. However, any pages that remain identical to the original pages in memory 320-11 may remain as a CoW references that takes up little to no additional memory resources.

Referring back to FIG. 2, at operation 230, the VM duplicator 150 may resume operation of the VCPU 315-11 of the parent VM 110-11 at any time after performing operation 215. After performance of operations 225 and/or 230, the VM duplicator 150 may end the process 200 or repeat the process 200 as necessary. In embodiments where the process 200 is run repeatedly, the VM duplicator 150 may leave the parent VM 105-1 stopped to avoid re-running operations 210 and 230.

Figure 9:
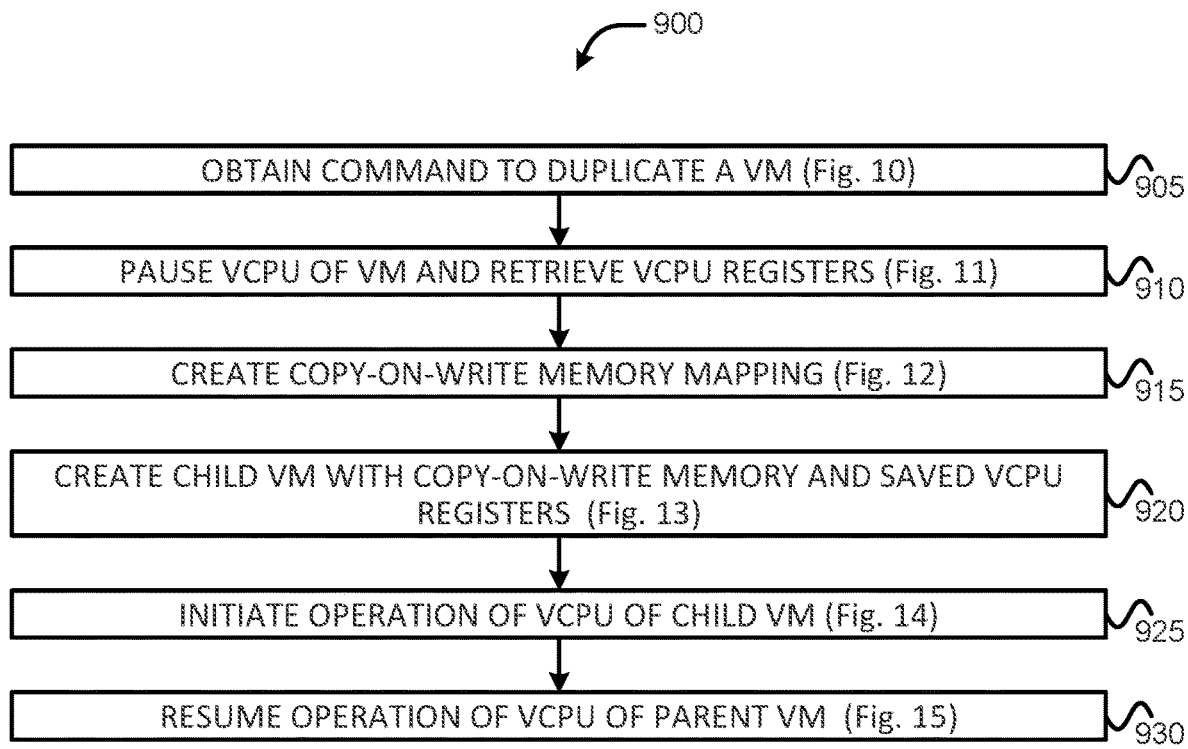
FIG. 9 illustrates another example process for duplicating VM states in accordance with various embodiments.

FIG. 9 illustrates a process 900 for duplicating a VM 110, in accordance with various embodiments. FIGS. 10-15 illustrate various stages, each of which corresponds to an operation of process 900. In particular, each of FIGS. 10-15 illustrate an example VMM 105 and/or VM 110 that may be implemented by computer device 100 as each operation of process 900 is performed using the computer device 100. For illustrative purposes, the operations of process 900 are described as being performed by the VM duplicator 150 as implemented by computer platform circuitry 300, which may include the one or more hardware components of the computer device 100 as shown and described with regard to FIG. 1. However, other components of the computer device 100 may perform the operations of process 900. In addition, process 900 may be performed when the VM 110 to be duplicated is operated by a type 1 hypervisor 105. Furthermore, while particular examples and orders of operations are illustrated in FIGS. 9-15, in various embodiments, these operations may be re-ordered, broken into additional operations, combined, and/or omitted altogether.

Figure 10:
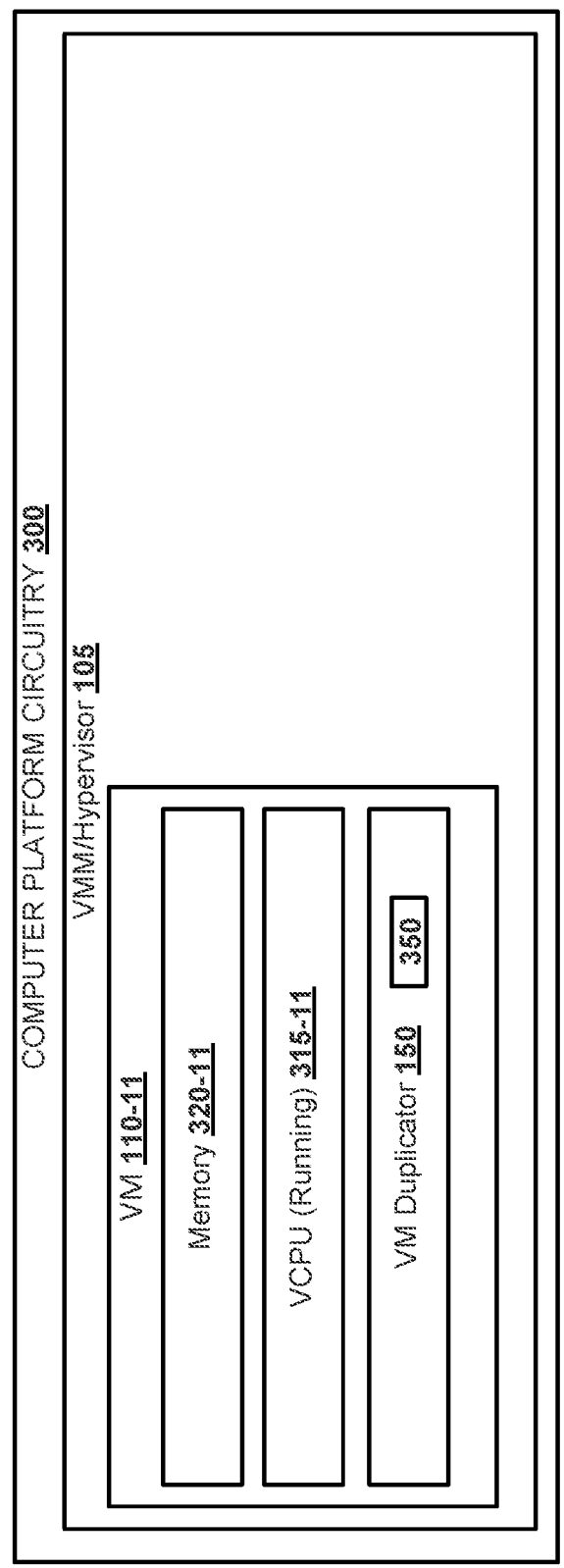
FIGS. 10-15 illustrate stages of performing the process of FIG. 9.

Referring to FIG. 9, process 900 may begin at operation 905 where the VM duplicator 150 may obtain or receive a command/trigger 350 to duplicate a VM 110, such as VM 110-11, as shown by FIG. 10. Operation 905 may be the same or similar as operation 205 discussed with regard to FIGS. 2-3, and command/trigger 350 may be the same or similar as discussed previously with regard to FIGS. 1-3. Furthermore, although FIG. 10 shows the VM duplicator 150 residing within the VM 110-11, in various embodiments, the VM duplicator 150 may be implemented by the VMM 105-1. Moreover, the memory 320-11 may be allocated within and may be accessible by the VM 110-11. Additionally, the VCPU 315-11 may execute program code within the hypervisor 105, and the VCPU registers of the VCPU 315-11 may not be directly exposed to the hypervisor 105 while running.

Figure 11:
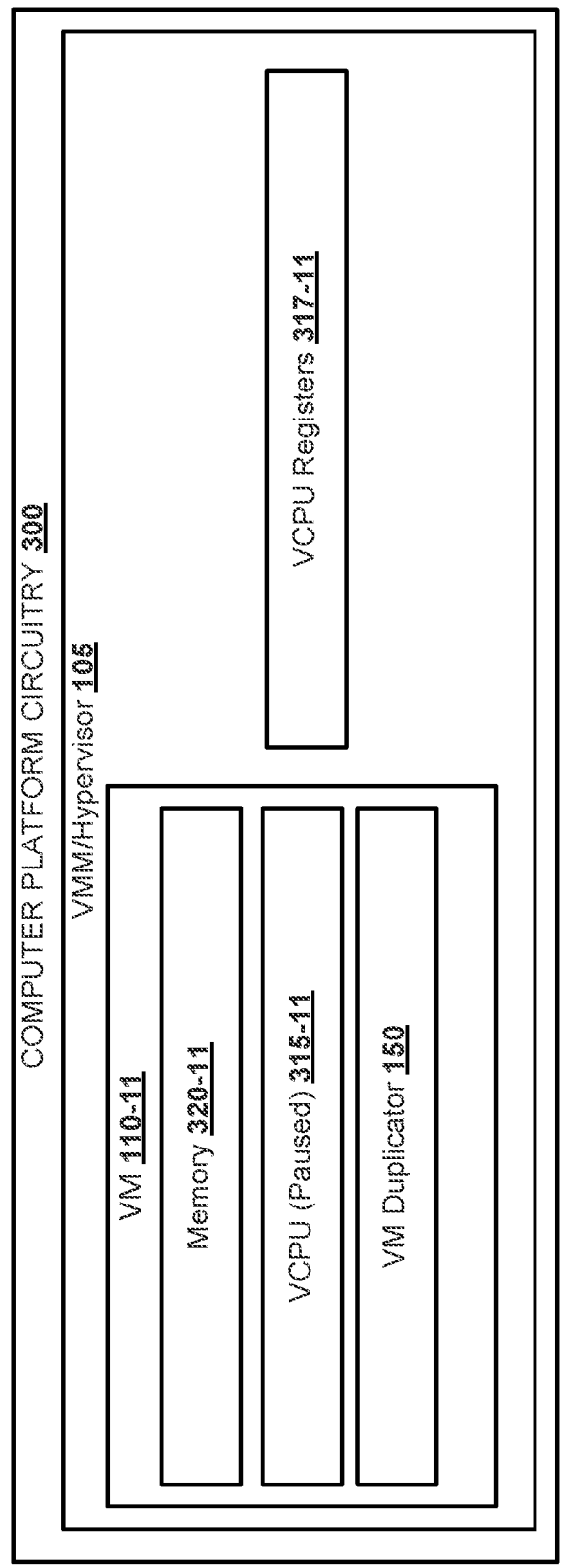

Referring back to FIG. 9, at operation 910 the VM duplicator 150 may pause the VCPU 315-11 of the VM 110-11 and retrieve the VCPU registers 317-11, as shown by FIG. 11. Operation 910 may be the same or similar as operation 210 discussed with regard to FIG. 2.

Figure 12:
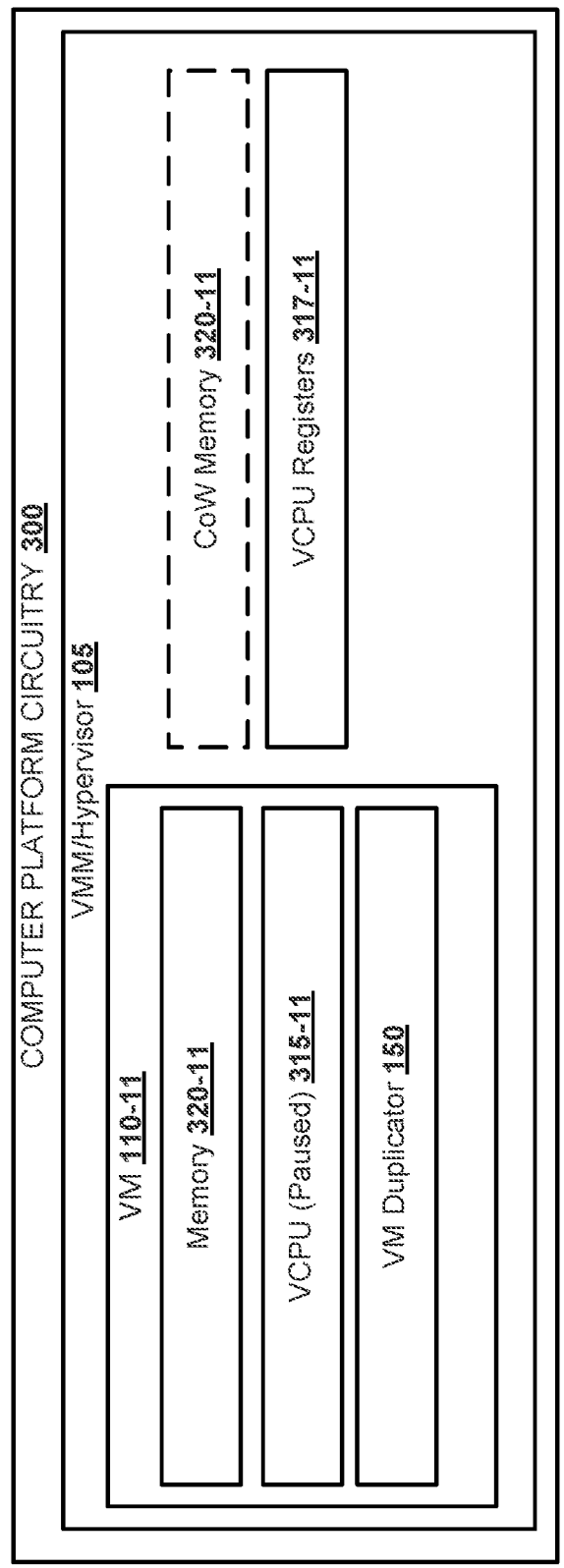

Referring back to FIG. 9, at operation 915 the VM duplicator 150 may create a CoW memory mapping as shown by FIG. 12. In embodiments, the CoW memory mapping may include references to shared memory resources (e.g., memory page tables that are used by the parent VM 1101-11). In FIG. 12, the state of the computer device 100 is shown after the VM duplicator 150 has performed a CoW operation of the memory 320-11, where the dashed rectangle in FIG. 12 represents a CoW copy of the memory 320-11 within the parent VMM 105-1 process. The CoW memory 320-11 may not take up additional space in the physical memory 120, and may not require performing a full copy operation.

Figure 13:
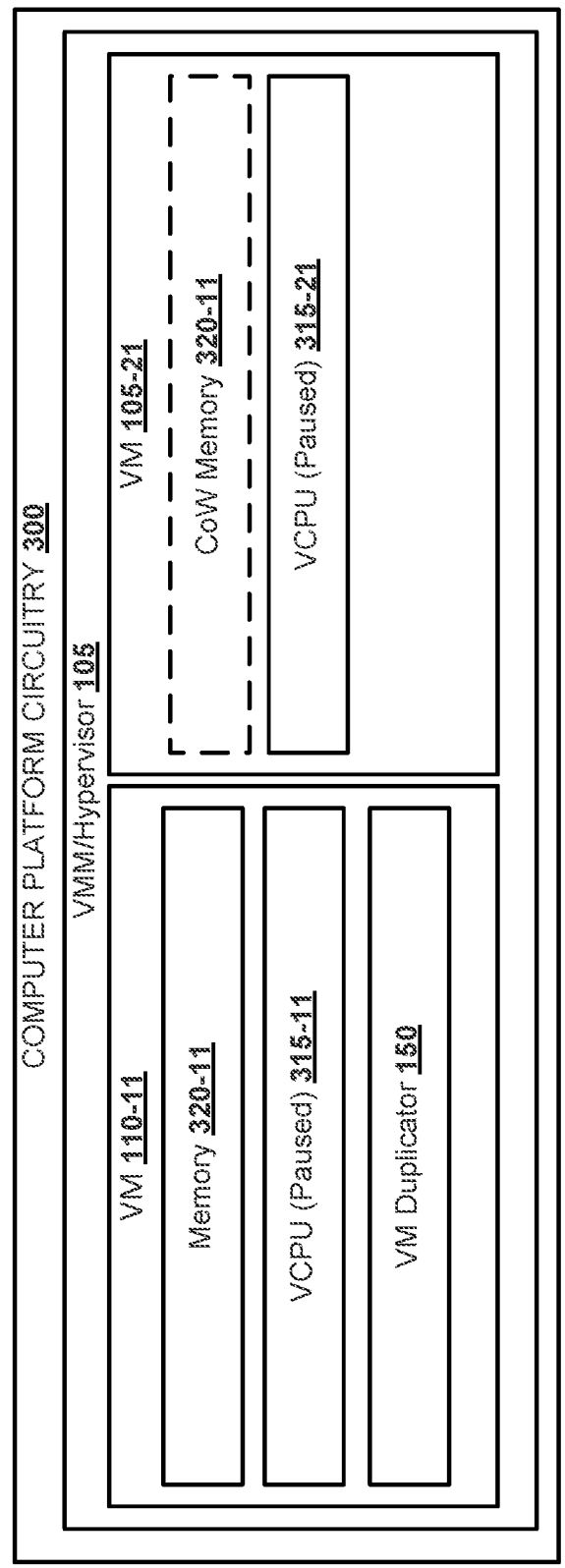

Referring back to FIG. 9, at operation 920 the VM duplicator 150 may create a child VM 110-21 with the CoW memory 320-11 and the saved VCPU registers 315-11, as shown by FIG. 13. FIG. 13 shows the state of the computer device 100 after the hypervisor 105 creates the child VM 110-21 including the CoW copy of the memory 320-21 (e.g., represented by the dashed rectangle in FIG. 13), and initializes the VCPU state of the VCPU 315-21. The VCPU state of the VCPU 315-21 may be based on the values that were stored/saved in the VCPU registers 317-11 at operation 910.

The initial VCPU state of the VCPU 315-21 may include modifications to allow the child VM 110-21 to distinguish itself from the parent VM 110-11, such as a different return value for an operation invoking the VM duplicator 150. The parent Vm 110-10 and the child VM 110-21 may propagate such modifications using distinct return values for the kfork system call and the like.

Figure 14:
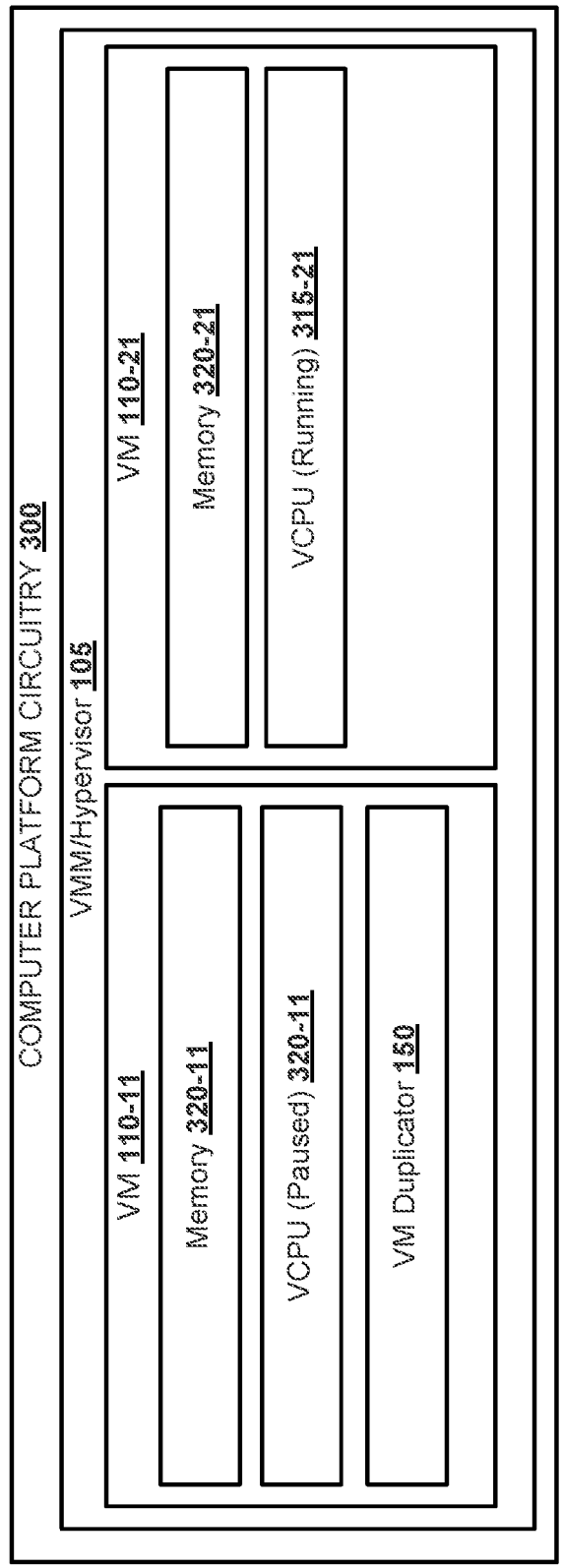
Figure 15:
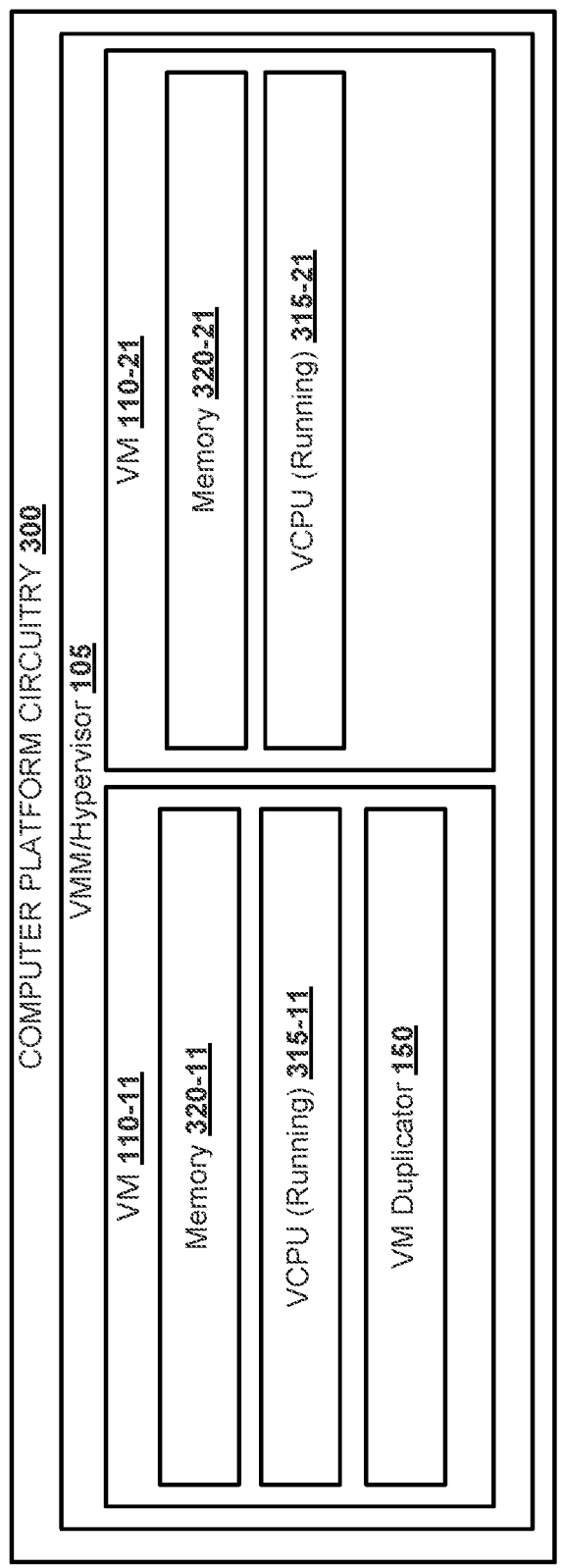

Referring back to FIG. 9, at operation 925 the VM duplicator 150 may initiate operation of the VCPU 315-21 of the child VM 110-21, as shown by FIG. 14. At operation 930 the VM duplicator 150 may resume operation of the VCPU 315-11 of the parent VM 110-11, as shown by FIG. 15.

Illustrative examples of the devices, systems, and methods disclosed herein are provided below. An embodiment of the devices, systems, and methods may include any one or more, and any combination of, the examples described below.

Example 1 may include an apparatus for computing, the apparatus comprising: a hardware processor and at least one hardware memory device; and a virtual machine monitor (VMM) to operate a parent virtual machine (VM), wherein the parent VM comprises a parent virtual memory and a parent virtual central processing unit (VCPU), and wherein the VMM is to duplicate the parent VM to create a child VM including a child VCPU based on a state of the parent VCPU and a child virtual memory based on the parent virtual memory.

Example 2 may include the apparatus of example 1 and/or some other examples herein, wherein the VMM is to pause the parent VCPU prior to retrieval of the VPCU state.

Example 3 may include the apparatus of examples 1-2 and/or some other examples herein, wherein the VMM is to: obtain a command to duplicate the parent VM; determine a VCPU state of the parent VCPU in response to the command; and generate the child VM based on the VCPU state.

Example 4 may include the apparatus of examples 1-3 and/or some other examples herein, wherein the VMM is to: generate a VMM child process prior to generation of the child VM; and generate the child VM within the VMM child process, wherein an operation to generate the VMM child process is a fork operation.

Example 5 may include the apparatus of examples 1-4 and/or some other examples herein, wherein the VCPU state is based on values stored in parent VCPU registers associated with the parent VCPU, and wherein the VMM is to: set registers of the child VCPU based on the parent VCPU registers; and generate the child VCPU based on values in the child VCPU registers.

Example 6 may include the apparatus of examples 1-5 and/or some other examples herein, wherein the VMM is to: initiate operation of the child VCPU within a VMM child process after generation of the child VCPU; and resume operation of the parent VCPU after generation of the VMM child process.

Example 7 may include the apparatus of examples 1-6 and/or some other examples herein, wherein the VMM is to generate the child virtual memory using values stored in the parent virtual memory.

Example 8 may include the apparatus of example 7 and/or some other examples herein, wherein the VMM is to perform a copy-on-write (CoW) copy of random access memory of the parent VM.

Example 9 may include the apparatus of example 1 to 8 and/or some other examples herein, wherein the VMM is a type 2 hypervisor.

Example 10 may include the apparatus of example 2 and/or some other examples herein, wherein the VCPU state is based on values stored in parent VCPU registers associated with the parent VCPU, and wherein the VMM is to: generate a copy-on-write (CoW) memory mapping prior to generation of the child VM and prior to retrieval of the VCPU state; and generate the child VM, wherein the child virtual memory is based on the CoW memory mapping and the child VCPU is based on values in the parent VCPU registers.

Example 11 may include the apparatus of example 10 and/or some other examples herein, wherein the VMM is to: initiate operation of the child VCPU within the child VM after generation of the child VCPU; and resume operation of the parent VCPU after initiation of the child VCPU.

Example 12 may include the apparatus of examples 10-11 and/or some other examples herein, wherein the VMM is a type 1 hypervisor.

Example 13 may include the apparatus of examples 1-12 and/or some other examples herein, wherein the VMM is to: obtain or receive a command to duplicate the parent VM from: an application or operating system (OS) implemented by the parent VM, an application or OS implemented by a host architecture that also implements the parent VM, or an application or OS implemented by another apparatus different than the apparatus that implements the parent VM.

Example 14 may include the apparatus of example 13 and/or some other examples herein, wherein the VMM is to obtain the command to duplicate the parent VM based on receipt of a request for a service.

Example 15 may include the apparatus of examples 1-14 and/or some other examples herein, wherein the command to duplicate the parent VM is to indicate a number of child VMs to generate or when a child VM is to be generated including after performance of an operation common to the parent VM and the child VM and before performance of an operation that is distinct to the child VM.

Example 16 may include one or more computer readable media including instructions, which when executed by a computer device implementing a virtual machine monitor (VMM), causes the computer device to: obtain a command to duplicate a parent virtual machine (VM) of the VMM to create a child VM of the VMM, wherein the parent VM includes a parent virtual central processing unit (VCPU) and a parent virtual memory; pause operation of the parent VCPU in response to receipt of the command; determine a VCPU state of the parent VCPU; and generate the child VM including a child VCPU based on the VCPU state of the parent VCPU and a child virtual memory based on the parent virtual memory. The one or more computer readable media may be non-transitory computer readable media.

Example 17 may include the one or more computer readable media of example 16 and/or some other examples herein, wherein the instructions, in response to execution by the computer device, cause the computer device to: generate a VMM child process prior to generation of the child VM; and generate the child VM within the VMM child process, wherein an operation to generate the VMM child process is a fork operation.

Example 18 may include the one or more computer readable media of examples 16-17 and/or some other examples herein, wherein the VCPU state is based on values stored in parent VCPU registers associated with the parent VCPU, and wherein the instructions, in response to execution by the computer device, cause the computer device to: set registers of the child VCPU based on the parent VCPU registers; and generate the child VCPU based on values in the child VCPU registers.

Example 19 may include the one or more computer readable media of examples 16-18 and/or some other examples herein, wherein the instructions, in response to execution by the computer device, cause the computer device to: initiate operation of the child VCPU within a VMM child process after generation of the child VCPU; and resume operation of the parent VCPU after generation of the VMM child process.

Example 20 may include the one or more computer readable media of examples 16-19 and/or some other examples herein, wherein the instructions, in response to execution by the computer device, cause the computer device to: generate the child virtual memory using values stored in the parent virtual memory.

Example 21 may include the one or more computer readable media of example 20 and/or some other examples herein, wherein the instructions, in response to execution by the computer device, cause the computer device to: perform a copy-on-write (CoW) copy of random access memory of the parent VM.

Example 22 may include the one or more computer readable media of examples 16-21 and/or some other examples herein, wherein the VMM is a type 2 hypervisor.

Example 23 may include the one or more computer readable media of example 16 and/or some other examples herein, wherein the VCPU state is based on values stored in parent VCPU registers associated with the parent VCPU, and wherein the instructions, in response to execution by the computer device, cause the computer device to: generate a copy-on-write (CoW) memory mapping prior to generation of the child VM and prior to retrieval of the VCPU state; and generate the child VM, wherein the child virtual memory is based on the CoW memory mapping and the child VCPU is based on values in the parent VCPU registers.

Example 24 may include the one or more computer readable media of example 23 and/or some other examples herein, wherein the instructions, in response to execution by the computer device, cause the computer device to: initiate operation of the child VCPU within the child VM after generation of the child VCPU; and resume operation of the parent VCPU after initiation of the child VCPU.

Example 25 may include the one or more computer readable media of examples 23-24 and/or some other examples herein, wherein the VMM is a type 1 hypervisor.

Example 26 may include the one or more computer readable media of examples 16-25 and/or some other examples herein, wherein the instructions, in response to execution by the computer device, cause the computer device to: obtain or receive a command to duplicate the parent VM from: an application or operating system (OS) implemented by the parent VM, an application or OS implemented by a host architecture that also implements the parent VM, or an application or OS implemented by another apparatus different than the apparatus that implements the parent VM.

Example 27 may include the one or more computer readable media of example 26 and/or some other examples herein, wherein the instructions, in response to execution by the computer device, cause the computer device to: obtain the command to duplicate the parent VM based on receipt of a request for a service.

Example 28 may include the one or more computer readable media of examples 16-27 and/or some other examples herein, wherein the command to duplicate the parent VM is to indicate a number of child VMs to generate or when a child VM is to be generated including after performance of an operation common to the parent VM and the child VM and before performance of an operation that is distinct to the child VM.

Example 29 may include a method to be performed by a computer device implementing a virtual machine monitor (VMM), the method comprising: obtaining or receiving, by the computer device, a command to duplicate a parent virtual machine (VM) to create a child VM, wherein the parent VM includes a parent virtual central processing unit (VCPU) and a parent virtual memory; pausing, by the computer device, operation of the parent VCPU in response to receipt of the command; determining, by the computer device, a VCPU state of the parent VCPU; and generating, by the computer device, the child VM including a child VCPU based on the VCPU state of the parent VCPU and a child virtual memory based on the parent virtual memory.

Example 30 may include the method of example 29 and/or some other examples herein, further comprising: generating, by the computer device, a VMM child process prior to generation of the child VM; and generating, by the computer device, the child VM within the VMM child process, wherein an operation to generate the VMM child process is a fork operation.

Example 31 may include the method of examples 29-30 and/or some other examples herein, wherein the VCPU state is based on values stored in parent VCPU registers associated with the parent VCPU, and the method further comprises: setting, by the computer device, registers of the child VCPU based on the parent VCPU registers; and generating, by the computer device, the child VCPU based on values in the child VCPU registers.

Example 32 may include the method of examples 29-31 and/or some other examples herein, further comprising: initiating, by the computer device, operation of the child VCPU within a VMM child process after generation of the child VCPU; and resuming, by the computer device, operation of the parent VCPU after generation of the VMM child process.

Example 33 may include the method of examples 29-32 and/or some other examples herein, further comprising: generating, by the computer device, the child virtual memory using values stored in the parent virtual memory.

Example 34 may include the method of example 33 and/or some other examples herein, further comprising: performing, by the computer device, a copy-on-write (CoW) copy of random access memory of the parent VM.

Example 35 may include the method of examples 29-34 and/or some other examples herein, wherein the VMM is a type 2 hypervisor.

Example 36 may include the method of example 29 and/or some other examples herein, wherein the VCPU state is based on values stored in parent VCPU registers associated with the parent VCPU, and the method further comprises: generating, by the computer device, a copy-on-write (CoW) memory mapping prior to generation of the child VM and prior to retrieval of the VCPU state; and generating, by the computer device, the child VM, wherein the child virtual memory is based on the CoW memory mapping and the child VCPU is based on values in the parent VCPU registers.

Example 37 may include the method of example 36 and/or some other examples herein, further comprising: initiating, by the computer device, operation of the child VCPU within the child VM after generation of the child VCPU; and resuming, by the computer device, operation of the parent VCPU after initiation of the child VCPU.

Example 38 may include the method of examples 36-37 and/or some other examples herein, wherein the VMM is a type 1 hypervisor.

Example 39 may include the method of examples 29-38 and/or some other examples herein, wherein obtaining or receiving the command to duplicate the parent VM comprises: receiving, by the computer device, the command from an application or operating system (OS) implemented by the parent VM, receiving, by the computer device, the command from an application or OS implemented by a host architecture that also implements the parent VM, or receiving, by the computer device, the command from an application or OS implemented by another apparatus different than the apparatus that implements the parent VM.

Example 40 may include the method of example 39 and/or some other examples herein, wherein obtaining or receiving the command to duplicate the parent VM comprises: receiving, by the computer device, the command to duplicate the parent VM based on receipt of a request for a service, and wherein the command to duplicate the parent VM is to indicate a number of child VMs to generate or when a child VM is to be generated including after performance of an operation common to the parent VM and the child VM and before performance of an operation that is distinct to the child VM.

Example 40x may include one or more computer readable media including instructions, which when executed by a computer device, causes the computer device to perform the method of examples 29-40 and/or some other examples herein. The one or more computer readable media may be non-transitory computer readable media.

Example 41 may include an apparatus for computing, the apparatus comprising: virtual machine monitor (VMM) means for operating a parent virtual machine (VM), wherein the parent VM comprises a parent virtual memory and a parent virtual central processing unit (VCPU); and VM duplication means for duplicating the parent VM to create a child VM including a child VCPU based on a state of the parent VCPU and a child virtual memory based on the parent virtual memory.

Example 42 may include the apparatus of example 41 and/or some other examples herein, wherein the VM duplication means is for pausing the parent VCPU prior to retrieval of the VPCU state.

Example 43 may include the apparatus of examples 41-42 and/or some other examples herein, wherein the VM duplication means is for: obtaining or receiving a command to duplicate the parent VM; determining a VCPU state of the parent VCPU in response to the command; and generating the child VM based on the VCPU state.

Example 44 may include the apparatus of examples 41-43 and/or some other examples herein, wherein the VM duplication means is for: generating a VMM child process prior to generation of the child VM; and generating the child VM within the VMM child process, wherein an operation to generate the VMM child process is a fork operation.

Example 45 may include the apparatus of examples 41-44 and/or some other examples herein, wherein the VCPU state is based on values stored in parent VCPU registers associated with the parent VCPU, and wherein the VM duplication means is for: setting registers of the child VCPU based on the parent VCPU registers; and generating the child VCPU based on values in the child VCPU registers.

Example 46 may include the apparatus of examples 41-45 and/or some other examples herein, wherein the VM duplication means is for: initiating operation of the child VCPU within a VMM child process after generation of the child VCPU; and resuming operation of the parent VCPU after generation of the VMM child process.

Example 47 may include the apparatus of examples 41-46 and/or some other examples herein, wherein the VM duplication means is for generating the child virtual memory using values stored in the parent virtual memory.

Example 48 may include the apparatus of example 47 and/or some other examples herein, wherein the VM duplication means is for performing a copy-on-write (CoW) copy of random access memory of the parent VM.

Example 49 may include the apparatus of examples 41-48 and/or some other examples herein, wherein the VMM is a type 2 hypervisor.

Example 50 may include the apparatus of example 42 and/or some other examples herein, wherein the VCPU state is based on values stored in parent VCPU registers associated with the parent VCPU, and wherein the VM duplication means is for: generating a copy-on-write (CoW) memory mapping prior to generation of the child VM and prior to retrieval of the VCPU state; and generating the child VM, wherein the child virtual memory is based on the CoW memory mapping and the child VCPU is based on values in the parent VCPU registers.

Example 51 may include the apparatus of example 50 and/or some other examples herein, wherein the VM duplication means is for: initiating operation of the child VCPU within the child VM after generation of the child VCPU; and resuming operation of the parent VCPU after initiation of the child VCPU.

Example 52 may include the apparatus of examples 50-51 and/or some other examples herein, wherein the VMM is a type 1 hypervisor.

Example 53 may include the apparatus of examples 41-52 and/or some other examples herein, wherein the VM duplication means is for: obtaining or receiving a command to duplicate the parent VM from: an application or operating system (OS) implemented by the parent VM, an application or OS implemented by a host architecture that also implements the parent VM, or an application or OS implemented by another apparatus different than the apparatus that implements the parent VM.

Example 54 may include the apparatus of example 53 and/or some other examples herein, wherein the VM duplication means is for obtaining or receiving the command to duplicate the parent VM based on receipt of a request for a service.

Example 55 may include the apparatus of examples 41-54 and/or some other examples herein, wherein the command to duplicate the parent VM is to indicate a number of child VMs to generate or when a child VM is to be generated including after performance of an operation common to the parent VM and the child VM and before performance of an operation that is distinct to the child VM.

Example 56 may include a system configured to operate a virtual machine monitor (VMM) and a virtual machine (VM) duplicator, wherein, to operate the VMM, the system is characterized in that the system is configured to operate a parent VM within the VMM, wherein the parent VM comprises a parent virtual memory and a parent virtual central processing unit (VCPU); and wherein, to operate the VM duplicator, the system is characterized in that the system is configured to duplicate the parent VM to create a child VM including a child VCPU based on a state of the parent VCPU and a child virtual memory based on the parent virtual memory.

Example 57 may include the system of example 56, wherein to operate the VM duplicator, the system is characterized in that the system is configured to pause the parent VCPU prior to retrieval of the VPCU state.

Example 58 may include the system of examples 56-57 and/or some other examples herein, wherein to operate the VM duplicator, the system is characterized in that the system is configured to: obtain or receiving a command to duplicate the parent VM; determine a VCPU state of the parent VCPU in response to the command; and generate the child VM based on the VCPU state.

Example 59 may include the system of examples 56-58 and/or some other examples herein, wherein to operate the VM duplicator, the system is characterized in that the system is configured to: generate a VMM child process prior to generation of the child VM; and generate the child VM within the VMM child process, wherein an operation to generate the VMM child process is a fork operation.

Example 60 may include the system of examples 56-59 and/or some other examples herein, wherein the VCPU state is based on values stored in parent VCPU registers associated with the parent VCPU, and wherein to operate the VM duplicator, the system is characterized in that the system is configured to: set registers of the child VCPU based on the parent VCPU registers; and generate the child VCPU based on values in the child VCPU registers.

Example 61 may include the system of examples 56-60 and/or some other examples herein, wherein to operate the VM duplicator, the system is characterized in that the system is configured to: initiate operation of the child VCPU within a VMM child process after generation of the child VCPU; and resume operation of the parent VCPU after generation of the VMM child process.

Example 62 may include the system of examples 56-61 and/or some other examples herein, wherein to operate the VM duplicator, the system is characterized in that the system is configured to generate the child virtual memory using values stored in the parent virtual memory.

Example 63 may include the system of example 62 and/or some other examples herein, wherein, to operate the VM duplicator, the system is characterized in that the system is configured to perform a copy-on-write (CoW) copy of random access memory of the parent VM.

Example 64 may include the system of examples 56-63 and/or some other examples herein, wherein the VMM is a type 2 hypervisor.

Example 65 may include the system of example 57 and/or some other examples herein, wherein the VCPU state is based on values stored in parent VCPU registers associated with the parent VCPU, and wherein to operate the VM duplicator, the system is characterized in that the system is configured to: generate a copy-on-write (CoW) memory mapping prior to generation of the child VM and prior to retrieval of the VCPU state; and generate the child VM, wherein the child virtual memory is based on the CoW memory mapping and the child VCPU is based on values in the parent VCPU registers.

Example 66 may include the system of example 65 and/or some other examples herein, wherein to operate the VM duplicator, the system is characterized in that the system is configured to: initiate operation of the child VCPU within the child VM after generation of the child VCPU; and resume operation of the parent VCPU after initiation of the child VCPU.

Example 67 may include the system of examples 65-66 and/or some other examples herein, wherein the VMM is a type 1 hypervisor.

Example 68 may include the system of example 56-67 and/or some other examples herein, wherein to operate the VM duplicator, the system is characterized in that the system is configured to: obtain or receive a command to duplicate the parent VM from: an application or operating system (OS) implemented by the parent VM, an application or OS implemented by a host architecture that also implements the parent VM, or an application or OS implemented by another apparatus different than the apparatus that implements the parent VM.

Example 69 may include the system of example 68 and/or some other examples herein, wherein to operate the VM duplicator, the system is characterized in that the system is configured to obtain or receive the command to duplicate the parent VM based on receipt of a request for a service.

Example 70 may include the system of examples 56-69 and/or some other examples herein, wherein the command to duplicate the parent VM is to indicate a number of child VMs to generate or when a child VM is to be generated including after performance of an operation common to the parent VM and the child VM and before performance of an operation that is distinct to the child VM.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

The invention claimed is:

1. An apparatus for computing, the apparatus comprising:
a hardware processor and at least one hardware memory device, the hardware processor arranged to operate a virtual machine monitor (VMM), wherein the VMM is arranged to operate a parent virtual machine (VM), wherein the parent VM comprises a parent virtual memory and a parent virtual central processing unit (VCPU), and the VMM is arranged to duplicate the parent VM to create a child VM, wherein, to duplicate the parent VM to create the child VM, the VMM is arranged to:
  in response to reaching a point immediately before performance of a distinct computation:
  pause the parent VCPU;
  retrieve a parent VCPU state after the parent VCPU is paused, the parent VCPU state being based on values stored in parent VCPU registers of the parent VCPU;
  generate a copy-on-write (CoW) memory mapping prior to generation of the child VM and prior to the retrieval of the parent VCPU state;
  create a CoW copy of the parent virtual memory and a CoW copy of the parent VCPU registers;
  create a child VCPU with a same state as the parent VCPU, the child VCPU including child VCPU registers based on the CoW copy of the parent VCPU registers;
  create the child VM including the child VCPU and child virtual memory based on the CoW memory mapping, the CoW copy of the parent virtual memory, and the values stored in the parent VCPU registers; and
  initiate operation of the child VCPU.

2. The apparatus of claim 1, wherein reaching the point immediately before performance of a distinct computation comprises detection of a trigger, and the trigger includes satisfaction of one or more conditions, the one or more conditions comprising one or more of mounting a root file system, running particular application code, and a command to duplicate the parent VM.

3. The apparatus of claim 1, wherein the VMM is arranged to:
  generate a VMM child process prior to generation of the child VM; and
  generate the child VM within the VMM child process, wherein an operation to generate the VMM child process is a fork operation based on a fork system call or a kernel fork system call.

4. The apparatus of claim 1, wherein the child VCPU state is based on values stored in the parent VCPU registers, and wherein the VMM is arranged to:
  set the child VCPU registers based on the parent VCPU registers; and
  generate the child VCPU based on values in the child VCPU registers.

5. The apparatus of claim 1, wherein the VMM is arranged to:
  initiate operation of the child VCPU within a VMM child process after generation of the child VCPU; and
  resume operation of the parent VCPU after generation of the VMM child process.

6. The apparatus of claim 1, wherein the VMM is arranged to generate the child virtual memory using CoW references to values stored in the parent virtual memory.

7. The apparatus of claim 6, wherein the parent virtual memory comprises virtual random access memory of the parent VM, and the child virtual memory comprises virtual random access memory of the child VM.

8. The apparatus of claim 7, wherein the VMM is a type 2 hypervisor, the trigger is a fork system call, and the VMM is arranged to generate a child process of the VMM, and create the child VCPU with the same state as the parent VCPU inside the child process.

9. The apparatus of claim 1, wherein the VMM is arranged to:
  initiate operation of the child VCPU within the child VM after generation of the child VCPU; and
  resume operation of the parent VCPU after initiation of the child VCPU.

10. The apparatus of claim 1, wherein the VMM is a type 1 hypervisor, and the VMM is arranged to create the CoW copy of the parent virtual memory and the CoW copy of the parent VCPU registers without duplicating an entire VMM process.

11. The apparatus of claim 1, wherein the trigger is a command to duplicate the parent VM, the command being an internal command or an external command, and the VMM is arranged to:
  obtain the command to duplicate the parent VM from an application or operating system (OS) implemented by the parent VM or an application or OS implemented by a host architecture that also implements the parent VM when the command is an internal command;
  obtain the command to duplicate the parent VM from an application or OS implemented by another apparatus different than the apparatus that implements the parent VM when the command is an external command;
  determine the parent VCPU state in response to receipt of the command; and
  generate the child VM based on the parent VCPU state.

12. The apparatus of claim 11, wherein the internal command is based on a point immediately before performance of a distinct computation being reached and the external command is based on receipt of a request for a service or a sensor input obtained by the apparatus.

13. The apparatus of claim 11, wherein the command to duplicate the parent VM indicates one or more of a number of child VMs to generate or when a child VM is to be generated including after performance of an operation common to the parent VM and the child VM and before performance of an operation that is distinct to the child VM.

14. One or more non-transitory computer readable media (NTCRM) comprising instructions, wherein execution of the instructions by a computer device implementing a virtual machine monitor (VMM) is to cause the computer device to:
   detect a trigger to duplicate a parent virtual machine (VM) of the VMM to create a child VM of the VMM, wherein the parent VM includes a parent virtual central processing unit (VCPU) and a parent virtual memory, and wherein the trigger includes reaching a point immediately before performance of a distinct computation;
   pause operation of the parent VCPU in response to detection of the trigger;
   determine a VCPU state of the parent VCPU based on values stored in parent VCPU registers of the parent VCPU;
   generate a copy-on-write (CoW) memory mapping prior to generation of the child VM and prior to the determination of the parent VCPU state;
   create a CoW copy of the parent virtual memory and a CoW copy of the parent VCPU registers;
   create a child VCPU with a same state as the parent VCPU, the child VCPU including child VCPU registers based on the CoW copy of the parent VCPU registers; and
   generate the child VM including the child VCPU and the child virtual memory based on the CoW memory mapping, the CoW copy of the parent virtual memory, and the values stored in the parent VCPU registers.

15. The one or more NTCRM of claim 14, wherein execution of the instructions is to cause the computer device to:
   generate a VMM child process prior to generation of the child VM; and
   generate the child VM within the VMM child process, wherein an operation to generate the VMM child process is a fork operation.

16. The one or more NTCRM of claim 14, wherein the VCPU state is based on values stored in parent VCPU registers associated with the parent VCPU, and wherein execution of the instructions is to cause the computer device to:
   set registers of the child VCPU based on the parent VCPU registers;
   generate the child virtual memory using values stored in the parent virtual memory; and
   generate the child VCPU based on values in the child VCPU registers.

17. The one or more NTCRM of claim 14, wherein execution of the instructions is to cause the computer device to:
   initiate operation of the child VCPU within a VMM child process after generation of the child VCPU; and
   resume operation of the parent VCPU after generation of the VMM child process.

18. The one or more NTCRM of claim 14, wherein the trigger further includes satisfaction of one or more conditions, the one or more conditions comprising one or more of mounting a root file system, running particular application code, and a command to duplicate the parent VM.

19. The one or more NTCRM of claim 14, wherein the VMM is a type 2 hypervisor or type 1 hypervisor.

20. A method to be performed by a computer device implementing a virtual machine monitor (VMM), the method comprising:
   detecting, by the computer device, a point immediately before performance of a distinct computation, the distinct computation being a point from which to duplicate a parent virtual machine (VM) to create a child VM, wherein the parent VM includes a parent virtual central processing unit (VCPU) and a parent virtual memory;
   pausing, by the computer device, operation of the parent VCPU in response to the detecting;
   determining, by the computer device, a VCPU state of the parent VCPU based on values stored in parent VCPU registers of the parent VCPU;
   generating, by the computer device, a CoW memory mapping prior to generating the child VM and prior to determining the VCPU state;
   creating, by the computer device, a copy-on-write (CoW) copy of the parent virtual memory and a CoW copy of the parent VCPU registers;
   creating, by the computer device, a child VCPU with a same state as the parent VCPU, the child VCPU, including child VCPU registers based on the CoW copy of the parent VCPU registers; and
   generating, by the computer device, the child VM including the child VCPU and the child virtual memory based on the CoW memory mapping, the CoW copy of the parent virtual memory, and the values stored in the parent VCPU registers.

21. The method of claim 20, further comprising:
   initiating, by the computer device, operation of the child VCPU within the child VM after generation of the child VCPU; and
   resuming, by the computer device, operation of the parent VCPU after initiation of the child VCPU.

22. The method of claim 20, wherein the VMM is a type 1 hypervisor.

23. The method of claim 20, further comprising:
   obtaining or receiving, by the computer device, a command to duplicate the parent VM, wherein obtaining or receiving the command to duplicate the parent VM comprises:
   receiving, by the computer device, the command from an application or operating system (OS) implemented by the parent VM,
   receiving, by the computer device, the command from an application or OS implemented by a host architecture that also implements the parent VM, or
   receiving, by the computer device, the command from an application or OS implemented by another apparatus different than the apparatus that implements the parent VM, and wherein the command to duplicate the parent VM is based on a request for a service.

24. The method of claim 23, wherein the command to duplicate the parent VM is to indicate a number of child VMs to generate and when the number of child VMs are to be generated including after performance of an operation common to the parent VM and the child VM and before performance of an operation that is distinct to the child VM.

* * * * *